US010973728B2

(12) United States Patent
Yamada et al.

(10) Patent No.: US 10,973,728 B2
(45) Date of Patent: Apr. 13, 2021

(54) WALKING SUPPORT ROBOT AND WALKING SUPPORT SYSTEM

(71) Applicant: Panasonic Corporation, Osaka (JP)

(72) Inventors: Kazunori Yamada, Aichi (JP); Mayu Watabe, Tokyo (JP); Mizuho Sakakibara, Tokyo (JP); Kenji Mase, Aichi (JP); Yuki Atsumi, Aichi (JP); Yoji Yamada, Aichi (JP)

(73) Assignee: PANASONIC CORPORATION, Osaka (JP)

( * ) Notice: Subject to any disclaimer, the term of this patent is extended or adjusted under 35 U.S.C. 154(b) by 421 days.

(21) Appl. No.: 15/898,425

(22) Filed: Feb. 17, 2018

(65) Prior Publication Data
US 2018/0235832 A1 Aug. 23, 2018

(30) Foreign Application Priority Data
Feb. 23, 2017 (JP) .............................. JP2017-032543

(51) Int. Cl.
*A61H 3/00* (2006.01)
*A61H 3/04* (2006.01)
(Continued)

(52) U.S. Cl.
CPC ................ *A61H 3/008* (2013.01); *A61H 3/04* (2013.01); *A61H 3/061* (2013.01); *G01S 17/93* (2013.01);
(Continued)

(58) Field of Classification Search
CPC .......... A61H 3/008; A61H 3/04; A61H 3/061; A61H 1/00; A61H 1/02; A61H 1/0237;
(Continued)

(56) References Cited

U.S. PATENT DOCUMENTS

2003/0077556 A1* 4/2003 French .................. A61B 5/1113
434/258
2011/0023820 A1* 2/2011 Donitz .................... F01L 13/04
123/316
(Continued)

FOREIGN PATENT DOCUMENTS

CA 2964778 A1 * 4/2016 ........... A61B 5/0205
CN WO 2018133050 A1 * 1/2017 ......... A61B 2505/09
(Continued)

OTHER PUBLICATIONS

Aaron Morriss et al., A Robotic Walker that Provides Guidance, 3 IEE International Conference on Robotics and Automation (2003). (Year: 2003).*

*Primary Examiner* — Tu A Vo
*Assistant Examiner* — Alexander Morales
(74) *Attorney, Agent, or Firm* — Greenblum & Bernstein. P.L.C.

(57) ABSTRACT

A walking support robot is presented by the present disclosure. The walking support robot moves in accordance with a handle load while guiding a user to walk along a walking route. The walking support robot includes a body, a handle on the body, a sensor that senses a load applied to the handle, and a moving device that moves the walking support robot by controlling rotation of a rotating member in accordance with the load. Guide information is generated for guiding the user to walk along the walking route. Presented information is presented for guiding the user based on the guide information. A physical task is set by adjusting complexity of the walking route. A degree to which the user follows the walking route is calculated, and the physical task is adjusted based on the degree.

20 Claims, 24 Drawing Sheets

(51) Int. Cl.
*G09B 7/02* (2006.01)
*A61H 3/06* (2006.01)
*G01S 17/93* (2020.01)

(52) U.S. Cl.
CPC ........ *G09B 7/02* (2013.01); *A61H 2201/1207* (2013.01); *A61H 2201/1602* (2013.01); *A61H 2201/1635* (2013.01); *A61H 2201/1659* (2013.01); *A61H 2201/5007* (2013.01); *A61H 2201/5043* (2013.01); *A61H 2201/5048* (2013.01); *A61H 2201/5058* (2013.01); *A61H 2201/5061* (2013.01); *A61H 2201/5064* (2013.01); *A61H 2201/5092* (2013.01)

(58) Field of Classification Search
CPC .................. A61H 1/0244; G09B 19/00; G09B 19/033–0038; A61B 5/16
See application file for complete search history.

(56) References Cited

U.S. PATENT DOCUMENTS

| | | | |
|---|---|---|---|
| 2014/0058299 A1* | 2/2014 | Sankai | A61H 3/00 601/35 |
| 2015/0359699 A1* | 12/2015 | Chang | A61H 3/04 701/22 |
| 2016/0058649 A1 | 3/2016 | Fu et al. | |
| 2016/0253890 A1* | 9/2016 | Rabinowitz | A61H 1/02 340/539.13 |
| 2018/0169476 A1 | 6/2018 | Shimada et al. | |

FOREIGN PATENT DOCUMENTS

| | | |
|---|---|---|
| JP | 2015-139554 A | 8/2015 |
| JP | 5975502 B1 | 8/2016 |
| JP | 2017-191301 | 10/2017 |
| WO | 2016/203664 A1 | 12/2016 |

* cited by examiner

FIG. 10

| DEGREE OF DIFFICULTY | COGNITIVE TASK |
|---|---|
| LOW | 3 + 5 = ?? |
| | ANY FOOD STARTING FROM "A"? |
| MEDIUM | 155 - 7 = ?? |
| | ANY RED FOOD STARTING FROM "E"? |
| HIGH | 255 - 167 = ?? |
| | ANY ANIMAL OF SIX CHARACTERS STARTING FROM "A"? |

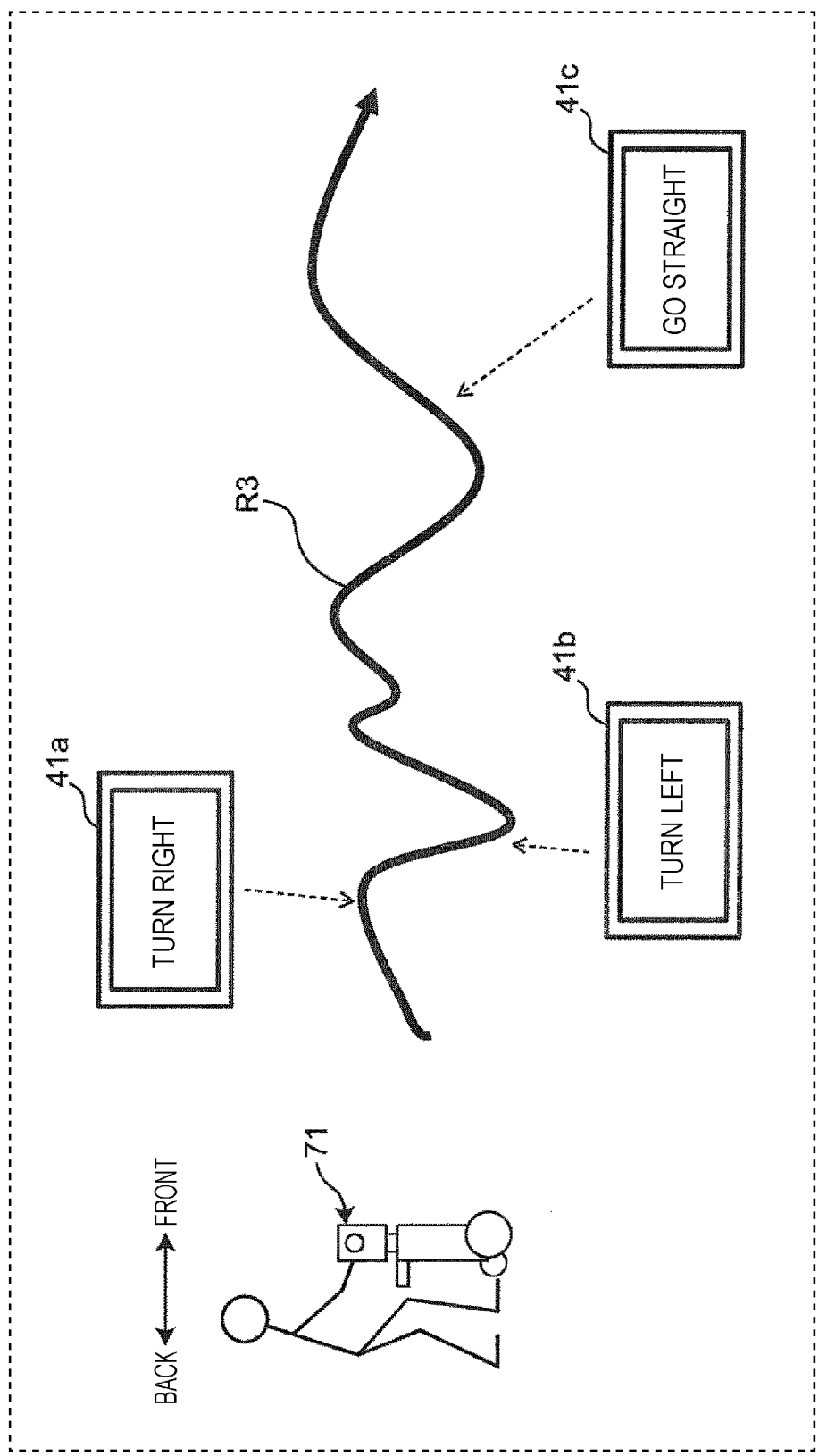

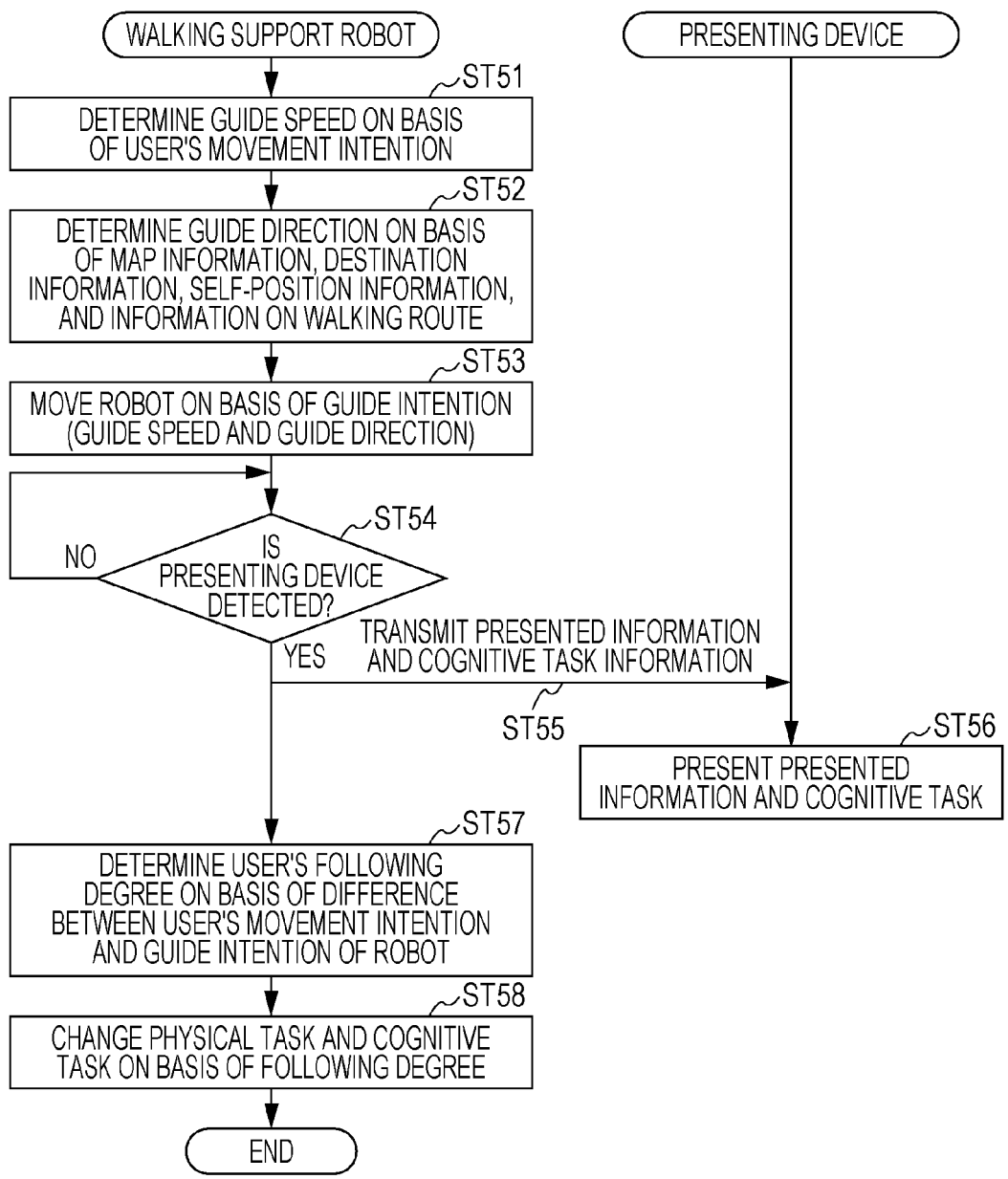

WALKING SUPPORT ROBOT AND WALKING SUPPORT SYSTEM

BACKGROUND

1. Technical Field

The present disclosure relates to a walking support robot and a walking support system for supporting user's walking.

2. Description of the Related Art

Various training systems are used in facilities such as a facility for elderly people in order to keep and improve physical performance of elderly people and to prevent and improve dementia of elderly people (see, for example, Japanese Patent No. 5975502).

Japanese Patent No. 5975502 discloses a brain training exercise therapy system that presents questions to a person on a training machine on which the person does monotonous exercise repeatedly.

SUMMARY

In recent year, there are demands for a walking support robot and a walking support system that improve physical performance while supporting user's walking.

One non-limiting and exemplary embodiment provides a walking support robot and a walking support system that can improve physical performance while supporting user's walking.

In one general aspect, the techniques disclosed here feature a walking support robot including: a body; a handle that is on the body and configured to be held by a user; a sensor that senses a load applied to the handle; a moving device that includes a rotating member and moves the walking support robot by controlling rotation of the rotating member in accordance with the load sensed by the sensor; and a processor that, in operation, performs operations including: generating guide information for guiding the user to walk along a walking route, presenting presented information for guiding the user on a basis of the guide information; setting a physical task by adjusting complexity of the walking route; calculating a following degree to which the user follows the walking route; and changing an intensity of the physical task on a basis of the following degree.

As described above, according to the walking support robot and the walking support system according to the present disclosure, it is possible to improve physical performance while supporting user's walking.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 10 illustrates an example of cognitive tasks;

FIG. 21A illustrates an example of walking support control of the walking support system according to Embodiment 4 of the present disclosure;

FIG. 23 is an exemplary flowchart of control of the walking support robot according to Embodiment 5 of the present disclosure.

DETAILED DESCRIPTION

Figure 1:
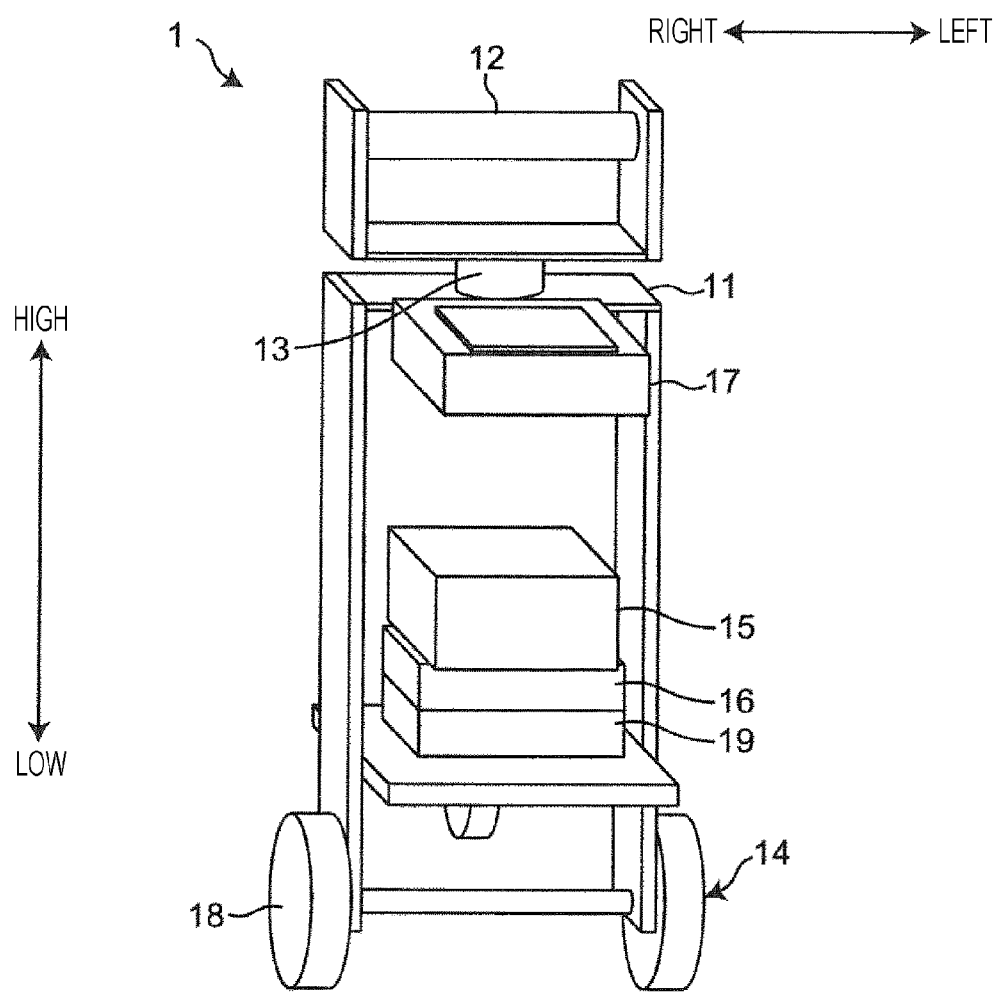
FIG. 1 illustrates external appearance of a walking support robot according to Embodiment 1 of the present disclosure.

Underlying Knowledge Forming Basis of the Present Disclosure

In recent years, the birth rate is decreasing and the population is aging in developed countries. Therefore, there is greater need to watch over elderly people and provide livelihood support to elderly people. Especially for elderly people, it tends to become difficult to keep quality of life (QOL) at home because of a decrease in physical performance resulting from aging. Furthermore, elderly people tends to have a greater risk of dementia because of aging.

In view of such circumstances, there are demands for a walking support robot and a walking support system that can effectively improve physical performance and prevent and improve dementia while supporting walking of a user such as an elderly person.

The inventors of the present invention newly found that physical performance of a person is improved by setting a complicated walking route in a walking support robot so that the person does a physical task using various physical functions related to walking in addition to walking exercise along a simple route. Specifically, the inventors of the present invention found that not only cardiorespiratory capacity and muscular strength for walking itself during walking in various environments in an actual world, but also physical performance that allows a person to properly move his or her body in response to events during actual walking such as a rough road, an obstacle, and a complicated route can be improved by the physical task in addition to simple exercise.

Furthermore, the inventors of the present invention found that dementia is effectively prevented and improved by confliction between a physical task and a cognitive task by giving a multitask that is a combination of the physical task and the cognitive task to a user by using a walking support robot.

Furthermore, the inventors of the present invention found that cognitive attentiveness during walking can be increased by changing a cognitive task on the basis of complexity of a surrounding environment in a walking support robot.

In view of this, the inventors of the present invention attained the following invention.

A walking support robot according to an aspect of the present disclosure includes: a body; a handle that is on the body and configured to be held by a user; a sensor that senses a load applied to the handle; a moving device that includes a rotating member and moves the walking support robot by controlling rotation of the rotating member in accordance with the load sensed by the sensor; and a processor that, in operation, performs operations including: generating guide information for guiding the user to walk along a predetermined walking route; presenting presented information for guiding the user on a basis of the guide information; setting a physical task by adjusting complexity of the walking route; calculating a following degree to which the user follows the walking route; and changing an intensity of the physical task on a basis of the following degree.

According to such a configuration, it is possible to set a physical task by adjusting complexity of a walking route and change a physical task intensity in accordance with a user's following degree while guiding the user to walk along a walking route. This makes it possible to improve physical performance while supporting user's walking.

The walking support robot may be configured such that the operations further include changing a force driving the rotating member on the basis of the following degree.

According to such a configuration, it is possible to change force driving the rotating member on the basis of the following degree and thereby adjust a load in walking support of the robot.

The walking support robot may be configured such that the operations further include: setting a cognitive task; determining a cognitive task achievement degree of the user; presenting the cognitive task; and changing the cognitive task on a basis of the cognitive task achievement degree.

According to such a configuration, it is possible to create confliction between a physical task and a cognitive task by setting the cognitive task in addition to the physical task, thereby effectively preventing and improving dementia.

The walking support robot may be configured such that the operations further include: lowering a degree of difficulty of the cognitive task in a case where the cognitive task achievement degree is lower than a predetermined first threshold value; and increasing the degree of difficulty of the cognitive task in a case where the cognitive task achievement degree is higher than a predetermined second threshold value.

According to such a configuration, in a case where the cognitive task achievement degree is high, it is possible to increase a degree of difficulty of the cognitive task, and in a case where the cognitive task achievement degree is low, it is possible to lower the degree of difficulty of the cognitive task. This makes it possible to set a degree of difficulty of a cognitive task in accordance with a user, thereby more effectively preventing and improving dementia.

The walking support robot may be configured such that the operations further include: lowering a degree of difficulty of the cognitive task in a case where the following degree is lower than a predetermined first threshold value; and increasing the degree of difficulty of the cognitive task in a case where the following degree is higher than a predetermined second threshold value.

According to such a configuration, in a case where the following degree of the user is high, it is possible to increase a degree of difficulty of the cognitive task, and in a case where the following degree of the user is low, it is possible to lower the difficulty of the cognitive task. This makes it possible to achieve balance between the physical task and the cognitive task, thereby more effectively preventing and improving dementia.

The walking support robot may be configured such that the operations further include changing the intensity of the physical task further on the basis of the cognitive task achievement degree.

According to such a configuration, in a case where the cognitive task achievement degree is high, the intensity of the physical task can be increased, and in a case where the cognitive task achievement degree is low, the degree of difficulty of the physical task can be lowered. This makes it possible to achieve balance between the physical task and the cognitive task, thereby more effectively preventing and improving dementia.

The walking support robot may be configured such that the operations further include: determining complexity of an environment surrounding the walking support robot; and changing the cognitive task further on a basis of the complexity of the environment.

According to such a configuration, it is possible to increase cognitive attentiveness during walking by changing the cognitive task on the basis of complexity of the surrounding environment.

The walking support robot may be configured such that the operations further include changing a kind of the cognitive task presented by the presenting of the cognitive task on the basis of the complexity of the environment.

According to such a configuration, it is possible to further increase cognitive attentiveness during walking by changing the kind of cognitive task on the basis of complexity of the surrounding environment.

The walking support robot may be configured such that the operations further include causing the presenter to present the cognitive task on a basis of a change of the handle load.

According to such a configuration, it is possible to detect that the user is walking and present a cognitive task.

The walking support robot may be configured to further include a warning device, wherein the operations further include causing the warning device to present a warning on a basis of at least one of the intensity of the physical task, a degree of difficulty of the cognitive task, the following degree, and the cognitive task achievement degree.

According to such a configuration, a surrounding person can be notified of a user's state by presenting a warning in accordance with a user's state during walking.

The walking support robot may be configured such that the operations further include accumulating history information on the following degree and the cognitive task achievement degree and changing at least one of the intensity of the physical task and a degree of difficulty of the cognitive task on a basis of the history information.

A walking support system according to one aspect of the present disclosure includes a walking support robot; and a presenting device; the presenting device and the walking support robot being connected over a network, wherein the walking support robot includes: a body; a handle that is on the body and configured to be held by a user; a sensor that senses a load applied to the handle; a moving device that includes a rotating member and moves the walking support robot by controlling rotation of the rotating member in accordance with the load sensed by the sensor; and a first processor that, in operation, performs first operations including: generating guide information for guiding the user to walk along a walking route; controlling presented information for guiding the user on a basis of the guide information; causing the presented information to be transmitted over the network; setting a physical task by adjusting complexity of the walking route; calculating a following degree to which the user follows the walking route; and changing an intensity of the physical task on a basis of the following degree; wherein the presenting device includes a second processor that, in operation, performs second operations including: receiving the presented information that is transmitted over the network; and presenting the presented information.

According to such a configuration, it is possible to set a physical task by adjusting complexity of a walking route and change a physical task intensity in accordance with a user's following degree while guiding a user to walk along the walking route. This makes it possible to improve physical performance while supporting user's walking. Furthermore, since the user walks in accordance with presented information presented by the presenting device disposed on an environment side; user's consciousness is directed to the environment side. It is therefore possible to set a task in a way closer to walking in an actual world.

The walking support system may be configured such that the first operations further include: setting a cognitive task; calculating a cognitive task achievement degree of the user; causing information on the cognitive task to be transmitted over the network; and changing the cognitive task on a basis of the following degree and the cognitive task achievement degree; wherein the second operations further include: receiving the information on the cognitive task that is transmitted over the network; and presenting the cognitive task.

According to such a configuration, it is possible to create confliction between a physical task and a cognitive task by setting the cognitive task in addition to the physical task, thereby effectively preventing and improving dementia. Furthermore, it is possible to apply a load of directing consciousness to a cognitive task presented by the presenting device disposed on the environment side, thereby more effectively preventing and improving dementia.

The walking support system may be configured such that the first operations further include: lowering a degree of difficulty of the cognitive task in a case where the cognitive task achievement degree is lower than a predetermined first threshold value; and increasing the degree of difficulty of the cognitive task in a case where the cognitive task achievement degree is higher than a predetermined second threshold value.

According to such a configuration, in a case where the cognitive task achievement degree is high, it is possible to increase the degree of difficulty of the cognitive task, and in a case where the cognitive task achievement degree is low, it is possible to lower the degree of difficulty of the cognitive task. This makes it possible to set a degree of difficulty of a cognitive task in accordance with a user, thereby more effectively preventing and improving dementia.

The walking support system may be configured such that the first operations further include: lowering a degree of difficulty of the cognitive task in a case where the following degree is lower than a predetermined first threshold value; and increasing the degree of difficulty of the cognitive task in a case where the following degree is higher than a predetermined second threshold value.

According to such a configuration, in a case where the users following degree is high, it is possible to increase the degree of difficulty of the cognitive task, and in a case where the users following degree is low, it is possible to lower the degree of difficulty of the cognitive task. This makes it possible to achieve balance between the physical task and the cognitive task, thereby more effectively preventing and improving dementia.

The walking support system may be configured such that the first operations further include changing the intensity of the physical task further on a basis of the cognitive task achievement degree.

According to such a configuration, in a case where the cognitive task achievement degree is high, it is possible to increase an intensity of a physical task, and in a case where the cognitive task achievement degree is low, it is possible to lower a degree of difficulty of the physical task. This makes it possible to achieve balance between the physical task and the cognitive task, thereby more effectively preventing and improving dementia.

The walking support system may be configured such that the first operations further include: determining complexity of an environment surrounding the walking support robot;

and changing the cognitive task further on a basis of the complexity of the environment.

According to such a configuration, it is possible to improve cognitive attentiveness during walking by changing a cognitive task on the basis of complexity of a surrounding environment.

The walking support system may be configured such that the first operations further include changing a kind of the cognitive task presented by the presenting of the cognitive task on the basis of the complexity of the environment.

According to such a configuration, it is possible to increase cognitive attentiveness during walking by changing the kind of cognitive task on the basis of complexity of a surrounding environment.

The walking support system may be configured such that the first operations further include: estimating a movement intention of the user on a basis of the load; calculating a guide intention of the walking support robot; moving the walking support robot by controlling rotation of the rotating member on a basis of the guide intention; and calculating the following degree on a basis of a difference between the guide intention and the movement intention of the user.

According to such a configuration, it is possible to calculate a following degree on the basis of a difference between a guide intention of the walking support robot and a user's movement intention while the walking support robot moves so as to guide the user along a walking route.

A walking support robot according to one aspect of the present disclosure includes: a body; a handle that is on the body and configured to be held by a user; a sensor that senses a load applied to the handle; a moving device that includes a rotating member and moves the walking support robot by controlling rotation of the rotating member in accordance with the load sensed by the sensor; and a processor that, in operation, performs operations including: generating guide information for guiding the user to walk along a walking route; presenting presented information for guiding the user on a basis of the guide information; setting a physical task by adjusting complexity of the walking route; setting a cognitive task; determining a cognitive task achievement degree of the user; and changing an intensity of the physical task on a basis of the cognitive task achievement degree.

According to such a configuration, it is possible to set a physical task by adjusting complexity of a walking route and change a physical task intensity in accordance with a user's following degree while guiding a user to walk along a walking route. This makes it possible to improve physical performance while supporting user's walking.

Embodiments of the present disclosure are described below with reference to the attached drawings. In the drawings, elements are illustrated in an exaggerated manner for easy understanding of description.

Embodiment 1

Overall Configuration

Figure 2:
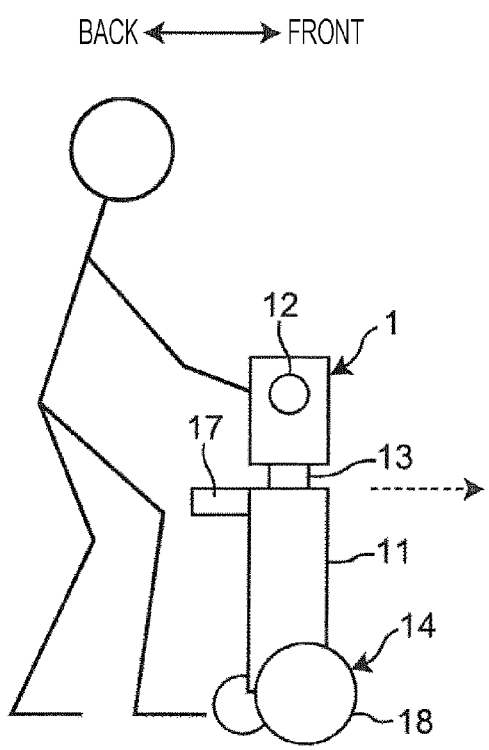
FIG. 2 illustrates how a user given walking support by the walking support robot according to Embodiment 1 of the present disclosure is walking.

FIG. 1 is a view illustrating external appearance of a walking support robot 1 (hereinafter referred to as a "robot 1") according to Embodiment 1. FIG. 2 illustrates how a user given walking support by the robot 1 is walking.

As illustrated in FIGS. 1 and 2, the robot 1 includes a body 11, a handle 12, a sensing unit 13, a moving device 14 that moves the body 11, a guide information generating unit 15, a task setting unit 16, and a presenting unit 17.

The robot 1 is a robot that supports user's walking and guides the user to a destination along a walking route. For example, the robot 1 calculates a walking route from destination information, self-position information, and map information and guides the user by presenting sound and/or an image so that the user can walk along the calculated walking route. The walking route as used herein refers to a route along which a user walks from a starting point to a destination.

The robot 1 moves on the basis of user's input. For example, the robot 1 estimates direction and speed of movement of the user on the basis of user's input and supports user's walking so that the user can stably walk. In Embodiment 1, the user's input is a load (handle load) applied to the handle 12 and is sensed by the sensing unit 13.

The body 11 is, for example, constituted by a frame having rigidity such that the body 11 can support other constituent members and support a load applied while the user walks.

The handle 12 is provided on an upper part of the body 11 in a shape and at a height that allow the user who is walking to easily hold the handle 12 with both hands.

The sensing unit 13 senses a handle load applied to the handle 12 by the user when the user holds the handle 12, Specifically, the user applies a handle load to the handle 12 when the user walks while holding the handle 12. The sensing unit 13 senses direction and magnitude of the handle load applied to the handle 12 by the user.

Figure 3:
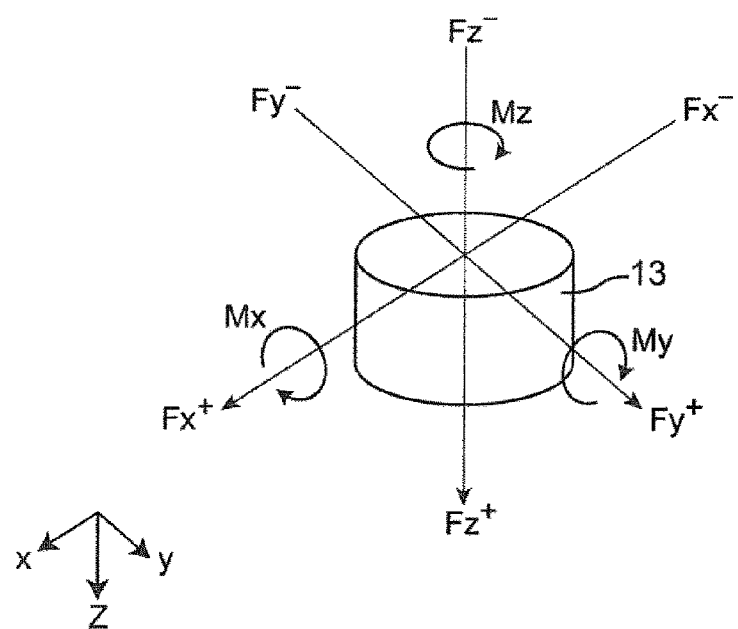
FIG. 3 illustrates a direction of sensing of a handle load sensed by a sensing unit according to Embodiment 1 of the present disclosure.

FIG. 3 illustrates a direction of sensing of a handle load sensed by the sensing unit 13. As illustrated in FIG. 3, the sensing unit 13 is a six-axis force sensor that is capable of detecting force applied in three-axis directions that are orthogonal to one another and moments around the three axes. The three axes that are orthogonal to one another are an x-axis extending in a left-right direction of the robot 1, a y-axis extending in a front-back direction of the robot 1, and a z-axis extending in a height direction of the robot 1. Force applied to the three-axis directions is force Fx applied in the x-axis direction, force Fy applied in the y-axis direction, and force Fz applied in the z-axis direction. In Embodiment 1, force Fx applied in a right direction is referred to as Fx+, and force Fx applied in a left direction is referred to as Fx−. Force Fy applied in a forward direction is referred to as Fy+, and force Fy applied in a backward direction is referred to as Fy−. Force Fz that is applied in a vertically downward direction with respect to a walking plane is referred to as Fz+, and force Fz applied to a vertically upward direction with respect to the walking plane is referred to as Fz−. The moments around the three axes are a moment Mx around the x-axis, a moment My around the y-axis, and a moment Mz around the z-axis.

The moving device 14 moves the body 11. The moving device 14 moves the body 11 on the basis of magnitude and direction of a handle load (force and moment) sensed by the sensing unit 13. In Embodiment 1, the moving device 14 performs the following control operation. Hereinafter, Fx, Fy, Fz, Mx, My, and Mz are sometimes referred to as a load.

Forward Moving Action

The moving device 14 moves the body 11 forward in a case where force Fy+ is sensed by the sensing unit 13. That is, in a case where Fy+ force is sensed by the sensing unit 13, the robot 1 moves forward. In a case where the Fy+ force sensed by the sensing unit 13 increases while the robot 1 is moving forward, the moving device 14 increases speed of the forward movement of the robot 1. Meanwhile, in a case where the Fy+ force sensed by the sensing unit 13 decreases while the robot 1 is moving forward, the moving device 14 decreases speed of the forward movement of the robot 1.

Backward Moving Action

The moving device 14 moves the body 11 backward in a case where Fy− force is sensed by the sensing unit 13. That is, in a case where Fy− force is sensed by the sensing unit 13, the robot 1 moves backward. In a case where the Fy− force sensed by the sensing unit 13 increases while the robot 1 is moving backward, the moving device 14 increases speed of the backward movement of the robot 1. Meanwhile, in a case where the Fy− force sensed by the sensing unit 13 decreases while the robot 1 is moving backward, the moving device 14 decreases speed of the backward movement of the robot 1.

Clockwise Turning Action

In a case where Fy+ force and Mz+ moment are sensed by the sensing unit 13, the moving device 14 causes the body 11 to turn in a clockwise direction. That is, in a case where Fy+ force and Mz+ moment are sensed by the sensing unit 13, the robot 1 turns in a clockwise direction. In a case where the Mz+ moment sensed by the sensing unit 13 increases while the robot 1 is turning in a clockwise direction, a radius of the turn of the robot 1 decreases. Meanwhile, in a case where the Fy+ force sensed by the sensing unit 13 increases while the robot 1 is turning in a clockwise direction, speed of the turn of the robot 1 increases.

Counterclockwise Turning Action

In a case where Fy+ force and Mz− moment are sensed by the sensing unit 13, the moving device 14 causes the body 11 to turn in a counterclockwise direction. That is, in a case where Fy+ force and Mz− moment are sensed by the sensing unit 13, the robot 1 turns in a counterclockwise direction. In a case where the Mz− moment sensed by the sensing unit 13 increases while the robot 1 is turning in a counterclockwise direction, a radius of the turn of the robot 1 decreases. Meanwhile, in a case where the Fy+ force sensed by the sensing unit 13 increases while the robot 1 is turning in a counterclockwise direction, speed of the turn of the robot 1 increases.

Note that control performed by the moving device 14 is not limited to the above example. The moving device 14 may control forward moving action and backward moving action of the robot 1, for example, on the basis of Fy force and Fz force. Furthermore, the moving device 14 may control a turning action of the robot 1, for example, on the basis of a Mx or My moment.

A handle load used to calculate a moving speed may be a load in the forward direction (Fy+), a load in the downward direction (Fz−), or a combination of the load in the forward direction (Fy+) and the load in the downward direction (Fz−).

The moving device 14 includes a rotating member 18 that is provided below the body 11 and a driving unit 19 that controls the rotating member 18 to be driven.

The rotating member 18 is a wheel that supports the body 11 in a state where the body 11 stands by itself and is driven to rotate by the driving unit 19. In Embodiment 1, two rotating members 18 are rotated by the driving unit 19, and thus the robot 1 moves. Specifically, the rotating members 18 move the body 11 in a direction (the forward direction or the backward direction) indicated by the arrow in FIG. 2 while keeping the standing posture of the robot 1, In Embodiment 1, an example in which the moving device 14 includes a moving mechanism using two wheels as the rotating member 18 has been described. However, Embodiment 1 is not limited to this. For example, the rotating member 18 may be a travelling belt or a roller.

The driving unit 19 drives the rotating member 18 on the basis of a handle load sensed by the sensing unit 13.

The guide information generating unit 15 generates guide information for guiding a user along a walking route. In Embodiment 1, the guide information is information for guiding a user and includes information on a guide direction. The guide information may include information such as a guide speed, a guide distance, a self-position, a map, and a walking route in addition to the guide direction.

The task setting unit 16 sets a task given to a user. In Embodiment 1, the task setting unit 16 sets a physical task that determines complexity of a walking route. Furthermore, the task setting unit 16 changes a physical task intensity in accordance with a following degree to which a user follows a walking route. The physical task as used herein refers to complexity of a body movement. The physical task intensity can be changed by adjusting complexity of a walking route.

The presenting unit 17 presents presented information for guiding a user on the basis of the guide information generated by the guide information generating unit 15. The presented information as used herein is information for guiding a user and includes, for example, information such as sound and/or an image. The presenting unit 17 is, for example, a speaker and/or a display.

Control Configuration of Walking Support Robot

Figure 4:
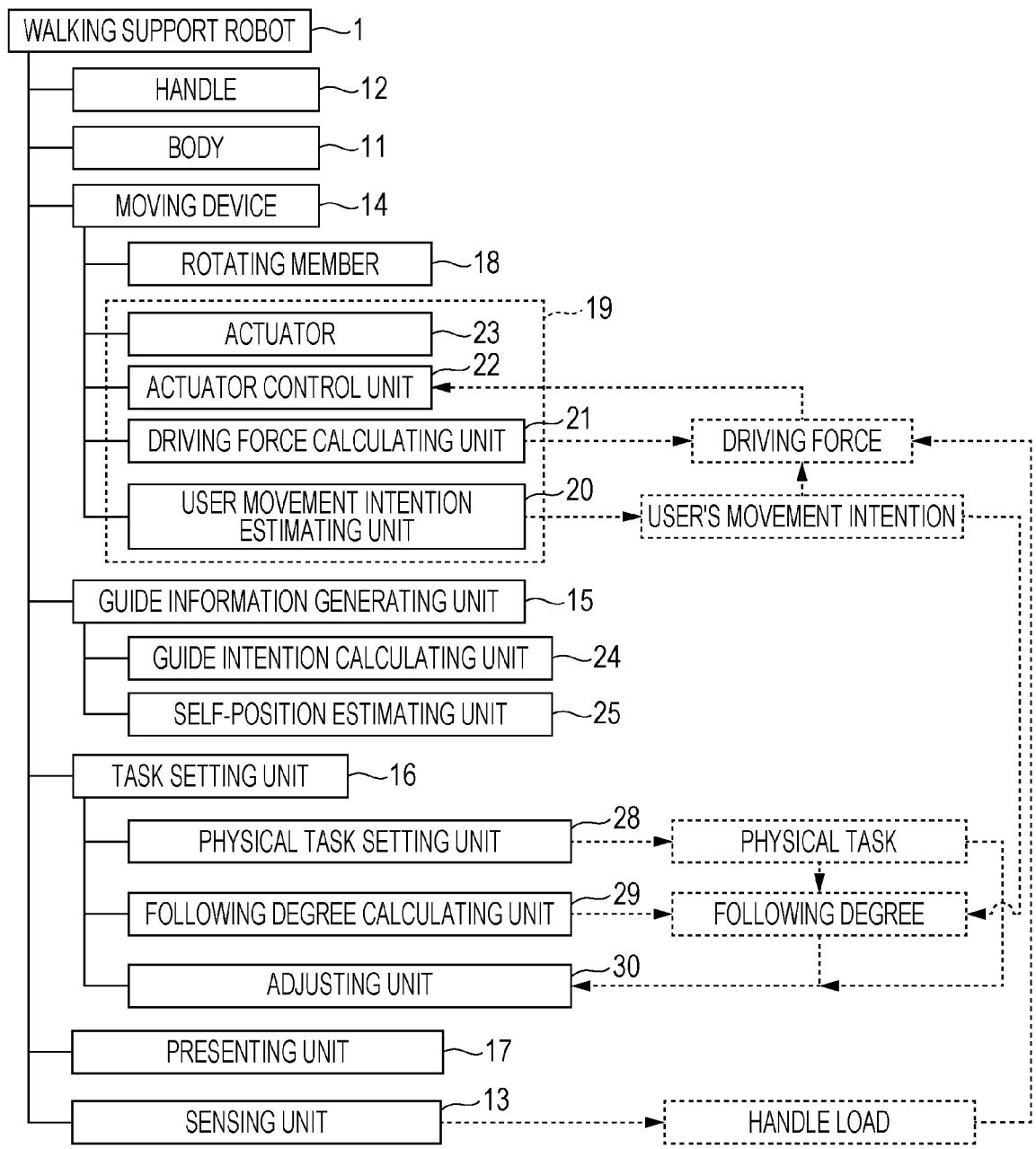
FIG. 4 is a control block diagram illustrating an example of a main control configuration of the walking support robot according to Embodiment 1 of the present disclosure.
Figure 5:
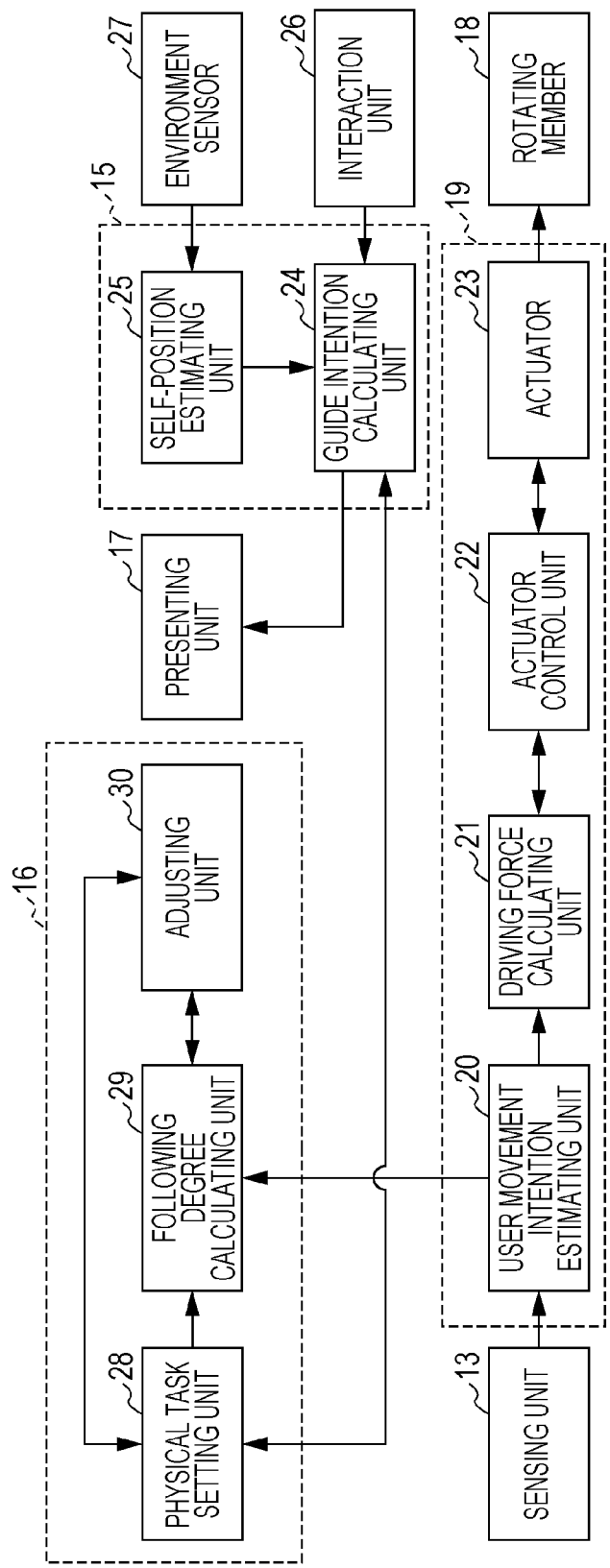
FIG. 5 is a control block diagram illustrating an example of a control configuration for walking support of the walking support robot according to Embodiment 1 of the present disclosure.

A control configuration for supporting user's walking in the walking support robot 1 having such a configuration is described below. FIG. 4 is a control block diagram illustrating a main control configuration in the robot 1. In the control block diagram of FIG. 4, a relationship between each control element and handled information is also illustrated. FIG. 5 is a control block diagram illustrating an example of a control configuration for walking support of the robot 1.

The driving unit 19 is described below. As illustrated in FIGS. 4 and 5, the driving unit 19 includes a user movement intention estimating unit 20, a driving force calculating unit 21, an actuator control unit 22, and an actuator 23.

The user movement intention estimating unit 20 estimates a user's movement intention on the basis of information on a handle load sensed by the sensing unit 13. The users movement intention includes a moving direction and a moving speed of the robot 1 that moves in accordance with the user's intention. In Embodiment 1, the user movement intention estimating unit 20 estimates a user's movement intention from a value of a handle load in each moving direction sensed by the sensing unit 13, For example, in a case where the Fy+ force sensed by the sensing unit 13 is equal to or larger than a predetermined first threshold value and where the My+ force is less than a predetermined second threshold value, the user movement intention estimating unit 20 may estimate that the user's movement intention is a forward moving action. Furthermore, the user movement intention estimating unit 20 may estimate a moving speed on the basis of a value of a handle load in the Fz direction. Meanwhile, in a case where the Fy+ force sensed by the sensing unit 13 is equal to or larger than a predetermined third threshold value and where the My+ force is equal to or larger than the predetermined second threshold value, the user movement intention estimating unit 20 may estimate that the user's movement intention is a clockwise turning action. Furthermore, the user movement intention estimating unit 20 may estimate a turning speed on the basis of a value of a handle load in the Fz direction and estimate a radius of a turn on the basis of a value of a handle load in the My direction.

In Embodiment 1, the user movement intention estimating unit 20 can also estimate a moving distance on the basis of information on a handle load. Specifically, the user movement intention estimating unit 20 can estimate a moving distance on the basis of a period for which a handle load is applied in a moving direction and a moving speed.

The driving force calculating unit 21 calculates driving force on the basis of the user's movement intention, i.e., user's moving direction and moving speed, estimated from information on a handle load by the user movement intention estimating unit 20. For example, the driving force calculating unit 21 calculates driving force so that amounts of rotation of two wheels (rotating members) 18 become equal to each other in a case where the user's movement intention is a forward moving action or a backward moving action. The driving force calculating unit 21 calculates driving force so that an amount of rotation of a right one of the two wheels 18 becomes larger than an amount of rotation of a left one of the two wheels 18 in a case where the user's movement intention is a clockwise turning action. The driving force calculating unit 21 calculates magnitude of driving force in accordance with a user's moving speed.

The actuator control unit 22 controls driving of the actuator 23 on the basis of information on driving force calculated by the driving force calculating unit 21. Furthermore, the actuator control unit 22 can acquire information on amounts of rotation of the wheels 18 from the actuator 23 and transmit information on the amounts of rotation of the wheels 18 to the driving force calculating unit 21.

The actuator 23 is, for example, a motor that drives the wheels 18 to rotate. The actuator 23 is connected to the wheels 18 with a gear mechanism or a pulley mechanism interposed therebetween. The actuator 23 drives the wheels 18 to rotate while driving of the actuator 23 is controlled by the actuator control unit 22.

The guide information generating unit 15 is described below. As described above, the guide information generating unit 15 generates guide information. As illustrated in FIGS. 4 and 5, the guide information generating unit 15 includes a guide intention calculating unit 24 that calculates a guide intention of the robot 1 and a self-position estimating unit 25 that estimates a position of the robot 1. In Embodiment 1, the guide intention includes a guide direction. The guide intention may include a guide speed in addition to the guide direction.

The guide intention calculating unit 24 calculates a guide intention of guiding a user to a destination along a walking route. In Embodiment 1, the guide intention includes a guide direction. The guide intention calculating unit 24 calculates a guide direction on the basis of destination information, self-position information of the robot 1, map information, and task information supplied from the task setting unit 16.

The destination information includes, for example, a destination, an arrival time, a walking route, and a purpose (e.g., meal, sleep). The destination information is acquired, for example, by user's input using an interaction unit 26. The interaction unit 26 is a device by which a user inputs destination information such as a destination and is realized, for example, by a voice-input device or a touch panel. The destination information input by using the interaction unit 26 is transmitted to the guide intention calculating unit 24.

The self-position of the robot 1 is estimated by the self-position estimating unit 25.

The map information is stored, for example, in a storage unit (not illustrated) of the robot 1. For example, the map information may be stored in advance in the storage unit or may be created by using an environment sensor 27. The map information can be created by using a SLAM technology.

The task information is set by the task setting unit 16. In Embodiment 1, the task information includes a physical task intensity.

The guide intention calculating unit 24 transmits information on the calculated guide intention to the presenting unit 17.

The self-position estimating unit 25 estimates a self-position of the robot 1, for example, on the basis of information acquired by the environment sensor 27. The self-position estimating unit 25 transmits information on the estimated self-position to the guide intention calculating unit 24.

The environment sensor 27 is a sensor that senses information on an environment surrounding the robot 1. The environment sensor 27 can be realized, for example, by a distance sensor, a laser range finder (LRF), a laser imaging detection and ranging (LIDAR), a camera, a depth camera, a stereo camera, a sonar, a sensor such as a RADAR, a global positioning system (GPS), or a combination thereof. Information acquired by the environment sensor 27 is transmitted to the self-position estimating unit 25.

The guide intention calculating unit 24 transmits destination information acquired from the interaction unit 26 and self-position information acquired by the self-position estimating unit 25 to the task setting unit 16.

As illustrated in FIGS. 4 and 5, the task setting unit 16 includes a physical task setting unit 28, a following degree calculating unit 29, and an adjusting unit 30.

The physical task setting unit 28 sets a physical task by adjusting complexity of a walking route from a starting point to a destination. The physical task setting unit 28 sets a physical task intensity, for example, on the basis of setting input by a user by using a physical task input unit (not illustrated). For example, the user sets a physical task intensity by selecting any one of physical task intensity setting buttons "high", "medium", and "low" displayed on the physical task input unit. Alternatively, the physical task setting unit 28 sets a physical task intensity on the basis of information on the user stored in the storage unit (not illustrated).

Example of Setting of Intensity of Physical Task

Figure 6A:
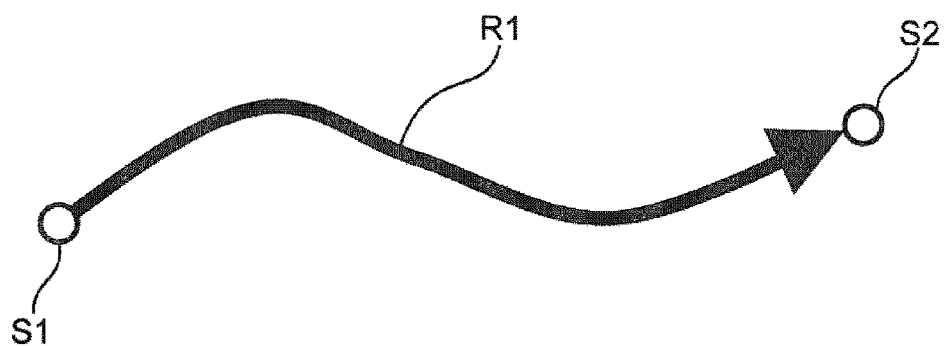
FIG. 6A illustrates an example of setting of an intensity of a physical task.
Figure 6B:
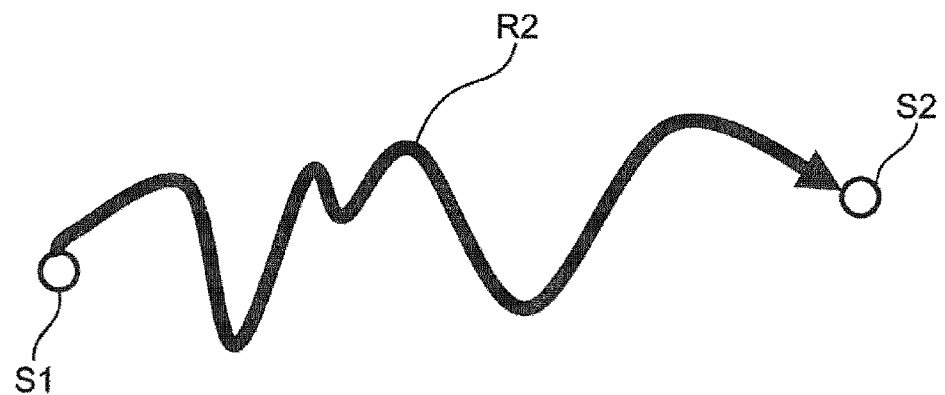
FIG. 6B illustrates an example of setting of an intensity of a physical task.

FIG. 6A illustrates an example of setting of a physical task intensity. Specifically, FIG. 6A illustrates a walking route of the physical task intensity "low". FIG. 6B illustrates another example of setting of a physical task intensity. Specifically, FIG. 6B illustrates a walking route of the physical task intensity "high".

As illustrated in FIG. 6A, in the example of setting of the physical task intensity "low", a walking route R1 from a starting point S1 to a destination S2 includes two large curves and three straight lines. That is, in setting of the physical task intensity "low", the walking route R1 is a monotonous route. On the monotonous route, body movement is monotonous, and a physical task intensity is low.

Meanwhile, as illustrated in FIG. 6B, in an example of setting of the physical task intensity "high", a walking route R2 from the starting point S1 to the destination S2 includes two large curves, three medium curves, two small curves, and four straight lines. In setting of the physical task intensity "high", the walking route R2 is a complicated route. On the complicated route, body movement is complicated, and a physical task intensity is high.

Example of Formula for Calculation of Physical Task Intensity

For example, the physical task intensity may be calculated by the following formula 1 on the basis of complexity of a walking route, i.e., the number of times and kinds of cornering per unit time.

$$(\text{physical task intensity}) = da + k \times dda \qquad \text{formula 1}$$

In the formula 1, "da" represents a rotation angle, "k" represents any coefficient, and "dda" represents the kind of curve. The rotation angle is, for example, a point of change of an angle in a rotation direction per 10 cm. The kind of curve is, for example, a point of a change amount of "da" per 50 cm.

In the formula 1, "da" increases as cornering becomes rapid, and "dda" increases as the kind of curve becomes disordered.

Another example of setting of a physical task intensity is described below. A physical task intensity may be calculated by the following formula 2 on the basis of complexity of a walking route, i.e., kinds and number of paths included in the walking route.

$$\text{(physical task intensity)} = sc \times m1 + mc \times m2 + bc \times m3 + st \times m4 \quad \text{formula 2}$$

In the formula 2, "sc" represents a point of a small curve, "mc" represents a point of a medium curve, "bc" represents a point of a large curve, and "st" represents a point of a straight line. Furthermore, "m1" represents the number of appearances of a small curve, "m2" represents the number of appearances of a medium curve, "m3" represents the number of appearances of a large curve, and "m4" represents the number of appearances of a straight line.

An example of setting of a physical task intensity using the formula 2 is described. A physical task intensity is set as follows on the basis of information on ten paths. Note that the following setting values of a physical task intensity are merely examples and the present embodiment is not limited to these setting values.

physical task intensity "high"=40 or more
physical task intensity "medium"=20 to 39
physical task intensity "low"=19 or less For example, in a case where a physical task intensity is set to "medium", the kinds of curves and straight lines appearing in a walking route are allocated as illustrated in Table 1 below.

TABLE 1

| route | points | the number of appearances (10 in total) |
|---|---|---|
| small curve (sc) | 6 | 1 |
| medium curve (mc) | 4 | 3 |
| large curve (bc) | 2 | 2 |
| straight line (st) | 1 | 4 |

In the case of Table 1, when a physical task intensity is calculated by the formula 2, the physical intensity is set to "medium" as follows:

$$\text{(physical task intensity)} = 6 \times 1 + 4 \times 3 + 2 \times 2 + 1 \times 4 = 26$$

As described above, the physical task setting unit 28 sets a physical task intensity by adjusting complexity of a walking route.

In Embodiment 1, the physical task setting unit 28 transmits, as task information, physical task information to the guide intention calculating unit 24, the following degree calculating unit 29, and the adjusting unit 30. The physical task information includes information such as a physical task intensity and a walking route determined in accordance with the physical task intensity.

The following degree calculating unit 29 calculates a following degree to which a user follows a walking route. Specifically, the following degree calculating unit 29 calculates a following degree to which a user follows a walking route determined in accordance with a physical task intensity set by the physical task setting unit 28. The following degree calculating unit 29 calculates a following degree, for example, on the basis of information on a walking route and information on movement of the robot 1.

In Embodiment 1, movement information of the robot 1 includes, for example, information on a moving direction and a moving distance of the robot 1. The information on the moving direction and the moving distance of the robot 1 is acquired from the user movement intention estimating unit 20.

The following degree calculating unit 29 determines whether or not the user is moving on the walking route on the basis of the information on the moving direction and the moving distance of the robot 1. Next, the following degree calculating unit 29 calculates a degree to which the user is moving on the walking route for a predetermined period, i.e., a following degree. The calculated following degree is transmitted to the adjusting unit 30.

The adjusting unit 30 changes a physical task intensity on the basis of the following degree calculated by the following degree calculating unit 29. In Embodiment 1, in a case where the following degree becomes lower than a predetermined threshold value A1, the physical task intensity is lowered, and in a case where the following degree becomes higher than a predetermined threshold value A2, the physical task intensity is increased.

The adjusting unit 30 transmits information on the changed physical task intensity to the physical task setting unit 28. Next, the physical task setting unit 28 changes the walking route on the basis of the information on the changed physical task intensity. Then, the physical task setting unit 28 transmits, as physical task information, information on the changed walking route to the guide intention calculating unit 24.

The guide intention calculating unit 24 calculates a guide intention (guide direction) of the robot 1 on the basis of destination information supplied from the interaction unit 26, self-position information supplied from the self-position estimating unit 25, map information read out from the storage unit, and information on a walking route supplied from the task setting unit 16. Next, the guide intention calculating unit 24 transmits, as guide information, the calculated guide direction to the presenting unit 17.

The presenting unit 17 presents presented information for guiding the user along the walking route on the basis of the guide information. For example, the presenting unit 17 presents the guide direction by sound and/or an image and thus guides the user to a destination along the walking route.

Control of Walking Support Robot

Figure 7:
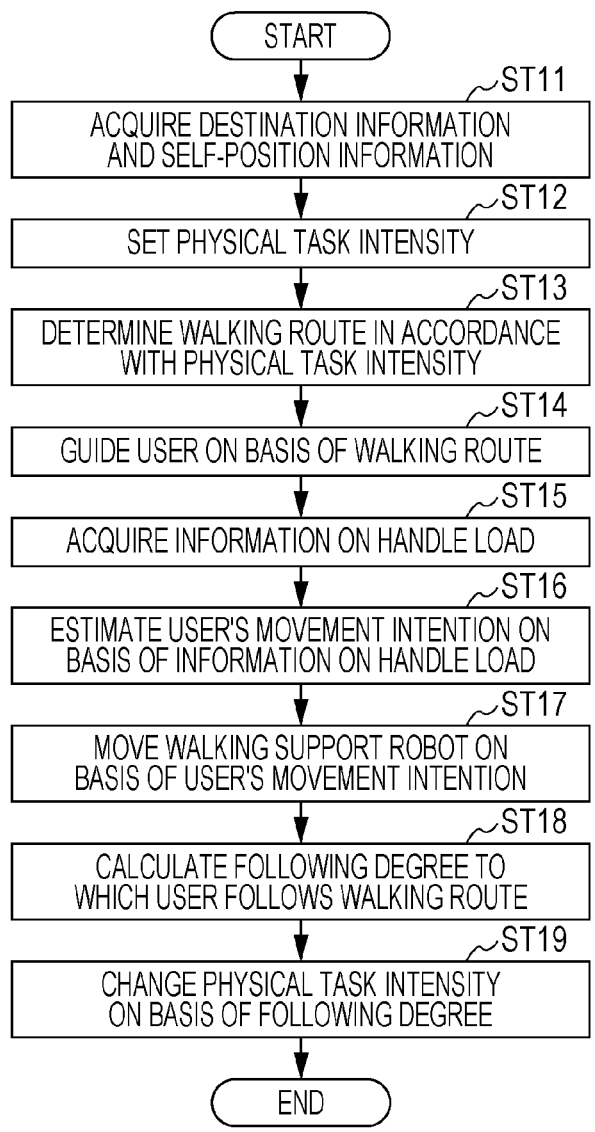
FIG. 7 is an exemplary flowchart of control of the walking support robot according to Embodiment 1 of the present disclosure.

Control of the robot 1 is described with reference to FIG. 7. FIG. 7 is an exemplary flowchart of control of the robot 1.

As illustrated in FIG. 7, in Step ST11, the guide information generating unit 15 acquires destination information and self-position information. Specifically, a user inputs destination information such as a destination with the use of the interaction unit 26. The destination information input with the use of the interaction unit 26 is transmitted to the guide intention calculating unit 24. The self-position information is generated by the self-position estimating unit 25 on the basis of environment information acquired by the environment sensor 27. The self-position information generated by the self-position estimating unit 25 is transmitted to the guide intention calculating unit 24. The guide intention calculating unit 24 transmits the destination information and the self-position information to the physical task setting unit 28.

In Step ST12, the physical task setting unit 28 sets a physical task intensity. Specifically, the user inputs a physical task intensity with the use of the physical task input unit. For example, the user sets a physical task intensity by selecting any of the physical task intensity setting buttons "high", "medium", and "low" displayed on the physical task input unit.

Alternatively, the physical task setting unit 28 sets a physical task intensity on the basis of information on the user stored in the storage unit.

In Step ST13, the physical task setting unit 28 determines a walking route in accordance with the physical task intensity. Specifically, the physical task setting unit 28 determines a walking route on the basis of the destination information and the self-position information received from the guide intention calculating unit 24, map information read out from the storage unit, and information on the physical task intensity.

For example, the physical task setting unit 28 estimates a plurality of walking routes from a current position to a destination on the basis of the destination information, the self-position information, and the map information. Complexity of each of the plurality of walking routes is converted into a numerical value according to the formula 1 or the formula 2, and the plurality of walking routes are classified according to a physical intensity. The physical task setting unit 28 determines a walking route from the estimated plurality of walking routes on the basis of the physical task intensity set in Step ST12.

The physical task setting unit 28 transmits, as physical task information, information on the walking route determined on the basis of the physical task intensity to the guide intention calculating unit 24.

In Step ST14, the presenting unit 17 guides the user on the basis of the walking route. Specifically, in Step ST14, the guide intention calculating unit 24 calculates a guide direction on the basis of information on the walking route determined by the physical task setting unit 28, the self-position information supplied from the self-position estimating unit 25, and the map information supplied from the storage unit. In Embodiment 1, the guide intention calculating unit 24 estimates a current position of the robot 1 on the basis of the map information and the self-position information and calculates a guide direction from the current position to the destination along the walking route. The calculated guide direction is transmitted as guide information to the presenting unit 17.

The presenting unit 17 presents presented information for guiding the user on the basis of the guide information (guide direction). In Embodiment 1, the presented information includes sound, an image, and/or the like for notifying the user of the guide direction. For example, when the user using the robot 1 comes right before a right-hand curve, the presenting unit 17 presents a message "turn right" on the basis of the guide information. When the user comes right before a left-hand curve, the presenting unit 17 presents a message "turn left" on the basis of the guide information. When the user comes to a straight path, the presenting unit 17 presents a message "go straight" on the basis of the guide information.

In Step ST15, the sensing unit 13 acquires information on a handle load. The information on the handle load sensed by the sensing unit 13 is transmitted to the user movement intention estimating unit 20.

In Step ST16, the user movement intention estimating unit 20 estimates a user's movement intention (a moving direction and a moving speed) on the basis of the information on the handle load.

In Step ST17, the moving device 14 moves the robot 1 on the basis of the user's movement intention.

In Step ST18, the following degree calculating unit 29 calculates a following degree to which the user follows the walking route. The following degree calculating unit 29 calculates the user's following degree on the basis of the walking route determined in Step ST13 and movement information of the robot 1.

The movement information of the robot 1 is calculated on the basis of the information on the user's movement intention. Specifically, the moving direction of the robot 1 is the same as the moving direction in the user's movement intention. The moving distance of the robot 1 is calculated on the basis of a period for which the handle load is applied in the moving direction and a moving speed.

The following degree calculating unit 29 calculates the following degree by determining whether or not the user is moving along the walking route on the basis of the movement information of the robot 1 and calculating a degree to which the user is moving along the walking route.

In Step ST19, the adjusting unit 30 changes the physical task intensity in accordance with the following degree calculated in Step ST18. For example, the adjusting unit 30 lowers the physical task intensity in a case where the following degree becomes lower than the predetermined threshold value A1 and increases the physical task intensity in a case where the following degree becomes higher than the predetermined threshold value A2.

The physical task intensity changed by the adjusting unit 30 is transmitted to the physical task setting unit 28. The physical task setting unit 28 changes the walking route in accordance with the physical task intensity changed by the adjusting unit 30, Furthermore, the physical task setting unit 28 transmits, as physical task information, information on the changed walking route to the guide intention calculating unit 24.

In this way, the robot 1 supports user's walking while changing a walking route by changing a physical task intensity in accordance with a degree to which the user follows the walking route.

Effects

According to the walking support robot 1 according to Embodiment 1, the following effects can be produced.

According to the walking support robot 1 according to Embodiment 1, it is possible to set a physical task by adjusting complexity of a walking route and change a physical task intensity in accordance with a user's following degree while guiding the user to a destination. It is therefore possible to improve physical performance while supporting user's walking.

Furthermore, by setting a complicated route, a user can do a physical task using various physical functions related to walking in addition to exercise of walking along a monotonous route. This produces another effect of enhancing not only cardiorespiratory capacity and muscular strength for walking itself during walking in various environments in an actual world, but also a walking ability that allows a person to properly move his or her body in response to events during actual walking such as a rough road, an obstacle, and a complicated route.

In Embodiment 1, elements that constitute the robot 1 may include, for example, a memory (not illustrated) in which a program that causes these elements to function is stored and a processing circuit (not illustrated) corresponding to a processor such as a central processing unit (CPU), and these elements may function by execution of the program by the processor. Alternatively, the elements that constitute the robot 1 may be constituted by an integrated circuit that causes these elements to function.

Although operations of the walking support robot 1 have been mainly described in Embodiment 1, these operations may be executed as a walking support method.

Although an example in which the sensing unit 13 is a six-axis force sensor has been described in Embodiment 1, Embodiment 1 is not limited to this. The sensing unit 13 may be, for example, a three-axis sensor or a strain sensor.

Although an example in which the moving device 14 calculates a moving speed on the basis of a value of a user's handle load has been described in Embodiment 1, Embodiment 1 is not limited to this. For example, the moving device 14 may calculate a moving speed on the basis of user's handle load $\pm\alpha$. The value of $\pm\alpha$ may be, for example, a fixed value, a value set for each user, or a value input by a user.

Although an example in which actions such as a forward moving action, a backward moving action, a clockwise turning action, and a counterclockwise turning action of the robot 1 are controlled by setting amounts of rotation of the two wheels (rotating members) 18 has been described in Embodiment 1, Embodiment 1 is not limited to this. For example, actions of the robot 1 may be controlled by controlling amounts of rotation of the wheels 18, for example, by using a brake mechanism.

Although an example in which the user movement intention estimating unit 20 estimates a user's movement intention on the basis of the handle load sensed by the sensing unit 13 has been described in Embodiment 1, Embodiment 1 is not limited to this. The user movement intention estimating unit 20 may estimate a user's movement intention on the basis of a corrected value (corrected handle load) of the handle load sensed by the sensing unit 13.

A handle load may be corrected, for example, by calculating a fluctuation frequency from past handle load data during user's walking and filtering out the fluctuation frequency from the handle load sensed by the sensing unit 13. Alternatively, a handle load may be corrected by using an average load value of handle loads sensed by the sensing unit 13. Alternatively, a handle load may be corrected on the basis of load tendency data of a user. Alternatively, a handle load value may be corrected on the basis of a place where the robot 1 is used, duration of use of the robot 1, a user's physical condition, or the like.

Although an example in which the guide information generating unit 15 generates, as guide information, information on a guide direction has been described in Embodiment 1, Embodiment 1 is not limited to this. For example, the guide information generating unit 15 may generate, as guide information, information such as a guide speed, a period of guide, a guide distance, a self-position, map information, and a walking route.

Although an example in which the presenting unit 17 presents presented information for guiding a user on the basis of information on a guide direction has been described in Embodiment 1, Embodiment 1 is not limited to this. For example, the presenting unit 17 may present presented information on the basis of information such as a guide speed, a period of guide, and a guide distance. Furthermore, the presenting unit 17 may present information such as map information, destination information, self-position information, information on a walking route, and information on a physical task intensity.

The presenting unit 17 may present a map showing a walking route from a starting point to a destination on the basis of the map information and the walking route information. Furthermore, the presenting unit 17 may present a current position of the robot 1 on the map on the basis of the self-position information and present a guide direction. Such a configuration allows a user to improve physical performance while more comfortably receiving walking support of the robot 1. In this case, the presenting unit 17 may receive the map information from the storage unit, the information on the walking route from the physical task setting unit 28, the destination information from the guide intention calculating unit 24, and the self-position information from the self-position estimating unit 25.

Although an example in which the presenting unit 17 includes a speaker and/or a display has been described in Embodiment 1, Embodiment 1 is not limited to this. For example, the presenting unit 17 may present presented information to a surrounding environment by using a projector.

Although an example in which the presented information is information such as sound and/or an image that guides a user along a walking route has been described, Embodiment 1 is not limited to this. For example, the presented information may be light emitted in a guide direction or an indicator indicating a guide direction.

Although an example in which the physical task setting unit 28 sets a physical task intensity on the basis of setting input by a user by using the physical task input unit (not illustrated) has been described in Embodiment 1, Embodiment 1 is not limited to this. For example, the physical task setting unit 28 may set a physical task intensity on the basis of setting input by a user by using the interaction unit 26.

Although an example in which the physical task setting unit 28 calculates a physical task intensity by using the formula 1 or the formula 2 has been described, Embodiment 1 is not limited to this. The physical task setting unit 28 may calculate a physical task intensity on the basis of complexity of a walking route by using any formula.

Although an example in which the physical task intensity is changed by adjusting complexity of a walking route has been described in Embodiment 1, Embodiment 1 is not limited to this. For example, the physical task intensity may be changed by adjusting a walking speed, a walking period, or the like in addition to complexity of a walking route.

Although an example in which the following degree calculating unit 29 calculates a following degree to which a user follows a walking route on the basis of movement information of the robot 1 has been described in Embodiment 1, Embodiment 1 is not limited to this. For example, the following degree calculating unit 29 may calculate a following degree to which a user follows a walking route on the basis of information on a self-position estimated by the self-position estimating unit 25 and map information read out from the storage unit.

Although an example in which the adjusting unit 30 lowers a physical task intensity in a case where the following degree becomes lower than the predetermined threshold value A1 and increases the physical task intensity in a case where the following degree becomes higher than the predetermined threshold value A2 has been described in Embodiment 1, Embodiment 1 is not limited to this. For example, the adjusting unit 30 may adjust the physical task intensity so that the following degree becomes equal to or higher than a predetermined threshold value A3. Alternatively, the adjusting unit 30 may accumulate information on a history of a following degree and gradually increase a physical task intensity so that a target physical task intensity can be achieved. Such a configuration makes it possible to train a user to target physical performance while giving walking support to the user.

The adjusting unit 30 may change force driving a rotating member on the basis of a following degree. For example, the adjusting unit 30 may decrease force driving the rotating member 18 in a case where the following degree becomes smaller than a predetermined threshold value A4. Thus, assist given to a user in a moving direction by movement of the robot 1 may be decreased. Alternatively, the adjusting unit 30 may adjust the force driving the rotating member 18 so that driving force in a direction opposite to a user's moving direction is generated in the rotating member 18 in a case where the following degree becomes lower than the predetermined threshold value A4. According to such a configuration, in a case where the following degree is low, it is possible to prompt a user to walk slowly by increasing a load applied to the user when the user moves while pushing the handle 12 of the robot 1.

Alternatively, the adjusting unit 30 may increase the force driving the rotating member 18 in a case where the following degree becomes lower than the predetermined threshold value A4. A load applied to the user may thus be lessened. Furthermore, the adjusting unit 30 may increase the force driving the rotating member 18 in a case where the following degree becomes higher than a predetermined threshold value A5. This makes it possible to increase a load applied to the user in a case where the following degree is high.

Although an example in which the robot 1 includes the guide information generating unit 15 and the task setting unit 16 has been described in Embodiment 1, Embodiment 1 is not limited to this. For example, the guide information generating unit 15 and the task setting unit 16 may be provided in an external computer such as a server, and the robot 1 may acquire information (guide information, task information) processed by the external computer over a network. Similarly, elements, such as the user movement intention estimating unit 20 and the driving force calculating unit 21, that process information may be provided not in the robot 1 but in the external computer.

Although an example in which the robot 1 includes the presenting unit 17 has been described in Embodiment 1, Embodiment 1 is not limited to this. For example, the presenting unit 17 may be disposed on a walking route.

Although an example in which a walking route is a path from a starting point to a destination has been described in Embodiment 1, Embodiment 1 is not limited to this. The walking route may be a route having no destination. For example, the route having no destination may be a loop-shaped path such as a ring-shaped loop or a figure-of-eight loop. Alternatively, the route having no destination may be a route that turns at any angle when the route comes close to a wall, an obstacle, or the like within a predetermined area. Alternatively, the route having no destination may be a route for which only the number and kinds of curves, the number of straight lines, and the like are preset and a walking direction is determined by a user.

Embodiment 2

A walking support robot according to Embodiment 2 of the present disclosure is described. In Embodiment 2, differences from Embodiment 1 are mainly described. In Embodiment 2, constituent elements that are identical or similar to those in Embodiment 1 are given identical reference signs. In Embodiment 2, descriptions similar to those in Embodiment 1 are omitted.

Embodiment 2 is different from Embodiment 1 in that a cognitive task is presented in addition to a physical task.

Control Configuration of Walking Support Robot

Figure 8:
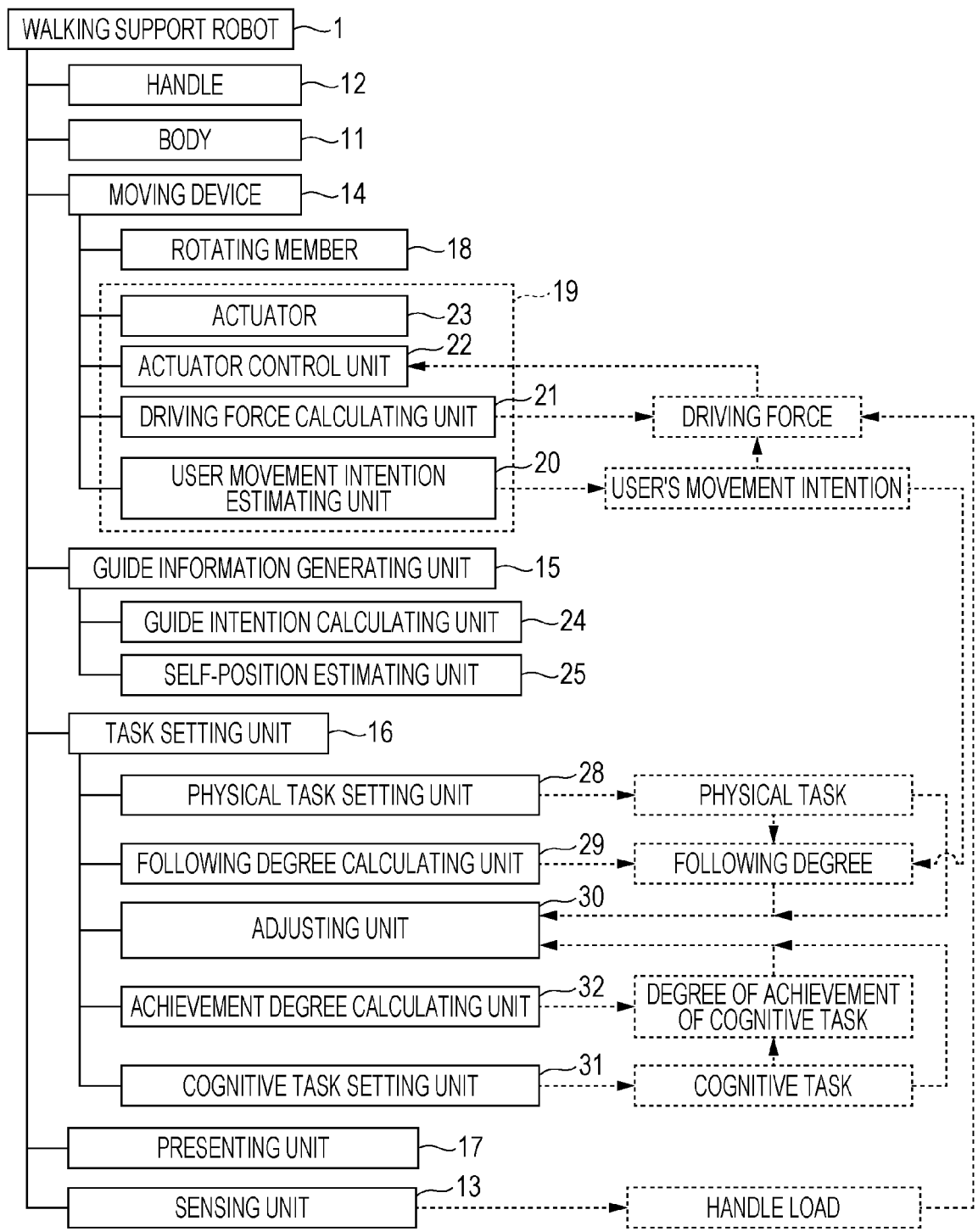
FIG. 8 is a control block diagram illustrating an example of a main control configuration of a walking support robot according to Embodiment 2 of the present disclosure.
Figure 9:
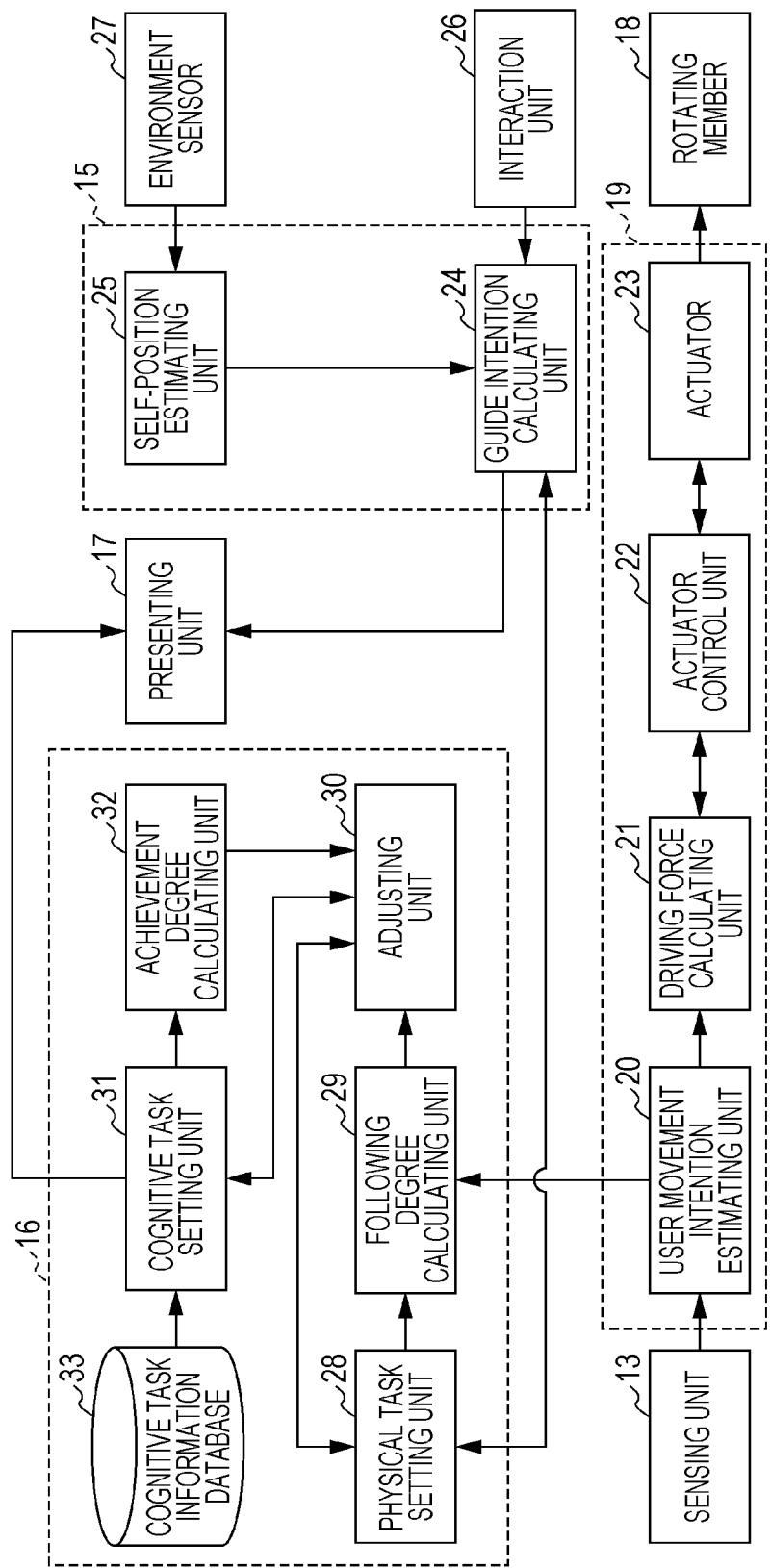
FIG. 9 is a control block diagram illustrating an example of a control configuration for walking support of the walking support robot according to Embodiment 2 of the present disclosure.

FIG. 8 is a control block diagram illustrating an example of a main control configuration of a walking support robot 51 (hereinafter referred to as a "robot 51") according to Embodiment 2. FIG. 9 is a control block diagram illustrating an example of a control configuration for walking support of the robot 51.

As illustrated in FIGS. 8 and 9, Embodiment 2 is different from Embodiment 1 in that a task setting unit 16 includes a cognitive task setting unit 31, an achievement degree calculating unit 32, and a cognitive task information database 33. In the robot 51 according to Embodiment 2, the cognitive task information database 33 is not essential.

The cognitive task setting unit 31 sets a cognitive task presented to a user. The cognitive task as used herein refers to a cognitive problem such as a calculation or a quiz. The cognitive task setting unit 31 sets a degree of difficulty and kind of a cognitive task, for example, on the basis of setting input by the user with the use of a cognitive task input unit (not illustrated). For example, the user sets a degree of difficulty of a cognitive task by selecting any of cognitive task setting buttons "high", "medium", and "low" displayed on the physical task input unit. Alternatively, the cognitive task setting unit 31 sets a degree of difficulty of a cognitive task on the basis of information on the user stored in a storage unit (not illustrated).

The kind of cognitive task as used herein refers to, for example, a visual task or an auditory task. Specifically, the kind of cognitive task includes presentation of a cognitive task as an image, presentation of an auditory task as sound, or both of them.

The cognitive task setting unit 31 acquires information on a cognitive task from the cognitive task information database 33.

FIG. 10 illustrates an example of cognitive tasks. As illustrated in FIG. 10, the cognitive task information database 33 stores therein information on cognitive tasks for each degree of difficulty. The cognitive task setting unit 31 sets a cognitive task by acquiring information on a cognitive task from the cognitive task information database 33 in accordance with a degree of difficulty. Examples of the cognitive task include a calculation problem and a sentence problem.

The information on the cognitive task set by the cognitive task setting unit 31 is transmitted to a presenting unit 17. The presenting unit 17 presents the cognitive task on the basis of the information on the cognitive task. A user's answer to the cognitive task presented by the presenting unit 17 can be acquired, for example, by user's input using the interaction unit 26.

The cognitive task setting unit 31 transmits the information on the cognitive task to an adjusting unit 30 and the achievement degree calculating unit 32.

The achievement degree calculating unit 32 calculates a user's cognitive task achievement degree. Specifically, the achievement degree calculating unit 32 calculates a rate of user's correct answers to a predetermined number of cognitive tasks. For example, the achievement degree calculating unit 32 counts the number of user's correct answers to ten cognitive tasks and thus calculates a user's cognitive task achievement degree. Information on the calculated cognitive task achievement degree is transmitted to the adjusting unit 30.

In Embodiment 2, the adjusting unit 30 changes a degree of difficulty of a cognitive task in accordance with the cognitive task achievement degree. Information on the changed degree of difficulty of a cognitive task is transmitted to the cognitive task setting unit 31. Next, the cognitive task setting unit 31 extracts information on a cognitive task corresponding to the changed degree of difficulty of a cognitive task from the cognitive task information database 33 and sets a new cognitive task.

Control of Walking Support Robot

Figure 11:
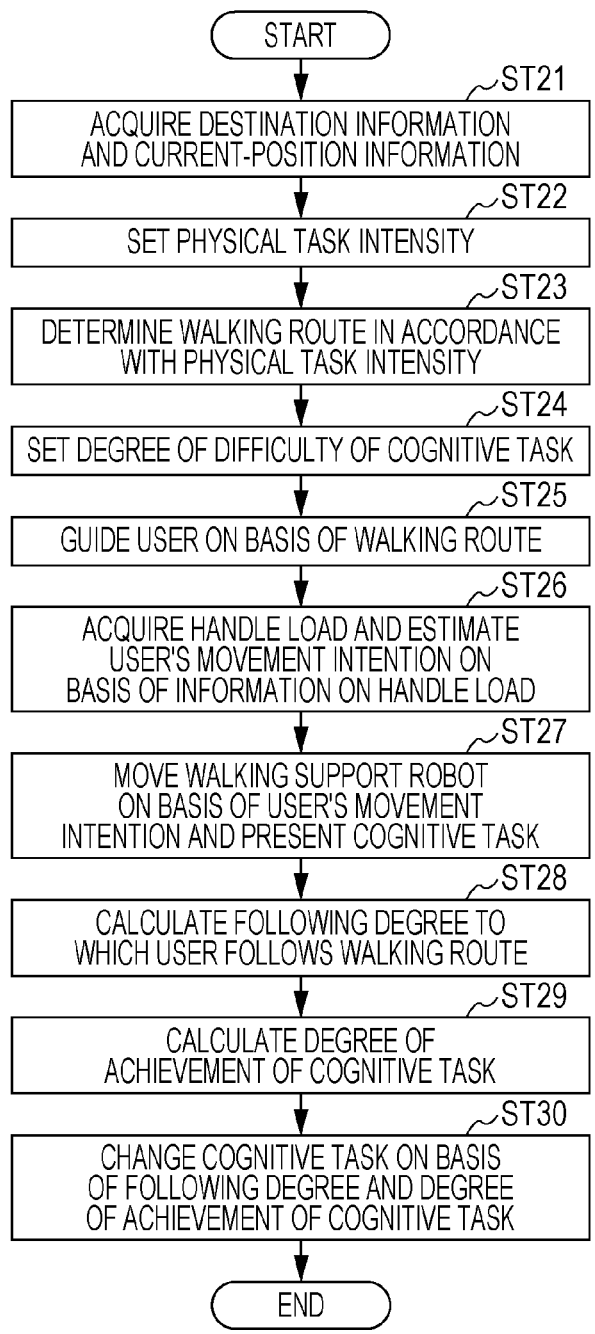
FIG. 11 is an exemplary flowchart of control of the walking support robot according to Embodiment 2 of the present disclosure.

Control of the robot 51 is described with reference to FIG. 11. FIG. 11 is an exemplary flowchart of control of the robot 51.

As illustrated in FIG. 11, in Step ST21, a guide information generating unit 15 acquires destination information and self-position information.

In Step ST22, a physical task setting unit 28 sets a physical task intensity.

In Step ST23, the physical task setting unit 28 determines a walking route in accordance with the physical task intensity.

In Step ST24, the cognitive task setting unit 31 sets a degree of difficulty of a cognitive task. Specifically, the cognitive task setting unit 31 sets a degree of difficulty of a cognitive task, for example, on the basis of setting input by a user with the use of the cognitive task input unit (not illustrated). Alternatively, the cognitive task setting unit 31 sets a degree of difficulty of a cognitive task on the basis of information on the user stored in the storage unit (not illustrated).

In Step ST25, the presenting unit 17 guides the user on the basis of the walking route.

In Step ST26, a sensing unit 13 acquires information on a handle load, and a user movement intention estimating unit 20 estimates a users movement intention (a moving direction and a moving speed) on the basis of information on the handle load.

In Step ST27, a moving device 14 moves a body 11 on the basis of the users movement intention, and the presenting unit 17 presents a cognitive task. Specifically, the presenting unit 17 presents the cognitive task on the basis of information on the cognitive task received from the cognitive task setting unit 31. The presenting unit 17 presents the cognitive task, for example, by using sound and/or an image.

In Embodiment 2, the presenting unit 17 presents the cognitive task while the user is walking, Specifically, the presenting unit 17 estimates that the user is walking from information on a change of the handle load and presents the cognitive task. For example, the presenting unit 17 estimates that the user is walking forward in a case where a handle load Fy+ becomes large.

The user inputs an answer to the cognitive task presented by the presenting unit 17, for example, with the use of the interaction unit 26. Information on the answer acquired by the interaction unit 26 is transmitted to the achievement degree calculating unit 32.

In Step ST28, a following degree calculating unit 29 calculates a following degree to which the user follows the walking route.

In Step ST29, the achievement degree calculating unit 32 calculates a user's cognitive task achievement degree. Specifically, the achievement degree calculating unit 32 calculates a cognitive task achievement degree on the basis of the information on the cognitive task supplied from the cognitive task setting unit 31 and information on the answer supplied from the interaction unit 26.

For example, the achievement degree calculating unit 32 calculates a rate of user's correct answers to a predetermined number of (ten) cognitive tasks. That is, the achievement degree calculating unit 32 calculates the rate of user's correct answers as the cognitive task achievement degree. Information on the calculated cognitive task achievement degree is transmitted to the adjusting unit 30.

In Step ST30, the adjusting unit 30 changes the cognitive task on the basis of the following degree and the cognitive task achievement degree. Specifically, the adjusting unit 30 lowers a degree of difficulty of a cognitive task in a case where the cognitive task achievement degree becomes lower than a predetermined first threshold value B1 and increases the degree of difficulty of the cognitive task in a case where the cognitive task achievement degree becomes higher than a predetermined second threshold value B2. Alternatively, the adjusting unit 30 lowers the degree of difficulty of the cognitive task in a case where the following degree becomes lower than a third threshold value B3 and increases the degree of difficulty of the cognitive task in a case where the following degree becomes higher than a fourth threshold value B4.

In this way, the robot 51 supports user's walking while changing a degree of difficulty of a cognitive task in accordance with a following degree to which a user follows a walking route and a user's cognitive task achievement degree.

Effects

According to the walking support robot 51 according to Embodiment 2, it is possible to produce the following effects.

According to the walking support robot 51 according to Embodiment 2, a physical task and a cognitive task can be combined by setting the cognitive task in addition to the physical task. This makes it possible to create confliction between the physical task and the cognitive task in the brain, thereby preventing and improving dementia.

According to the robot 51, it is possible to adjust a degree of difficulty of a cognitive task on the basis of a following degree and a cognitive task achievement degree. This makes it possible to achieve balance between the physical task and the cognitive task. That is, it is possible to achieve balance between a load applied to a body and a load applied to a brain. By thus appropriately set the loads, it is possible to more effectively present dementia and improve a cognitive function.

Furthermore, enhancement of physical performance for properly executing a physical task even in a situation where a cognitive load is present such as a case where processing of information on a surrounding environment during walking or processing of information during walking is needed.

Although an example in which the adjusting unit 30 changes a degree of difficulty of a cognitive task on the basis of a following degree and a cognitive task achievement degree has been described in Embodiment 2, Embodiment 2 is not limited to this. For example, the adjusting unit 30 may change a degree difficulty of a cognitive task for example, on the basis of at least one of a following degree and a cognitive task achievement degree.

For example, the adjusting unit 30 may change a physical task intensity on the basis of a cognitive task achievement degree without considering a following degree. In this case, the robot 51 need not include the following degree calculating unit 29. According to such a configuration, it is possible to decrease a load applied to a user by a physical task by lowering a physical task intensity in a case where the cognitive task achievement degree is low, thereby achieving balance between the cognitive task and the physical task.

Although an example in which the adjusting unit 30 lower a degree of difficulty of a cognitive task in a case where a following degree or a cognitive task achievement degree becomes lower than the predetermined threshold value B1 or B3 and increases the degree of difficulty of the cognitive task in a case where the following degree or the cognitive task achievement degree becomes higher than the predetermined threshold value B2 or B4 has been described above, Embodiment 2 is not limited to this. For example, the adjusting unit 30 may gradually increase a degree of difficulty of a cognitive task so that a user's cognitive task achievement degree reaches a target cognitive task achievement degree.

The adjusting unit 30 may accumulate history information of a following degree and a cognitive task achievement degree and change at least one of the following degree and the cognitive task on the basis of the history information. A physical task intensity or a degree of difficulty of a cognitive task that corresponds to a user can be set by using the history information of a following degree and a cognitive task achievement degree.

The adjusting unit 30 may change the kind of cognitive task on the basis of a following degree and a cognitive task achievement degree. For example, the adjusting unit 30 may change the kind of cognitive task from a visual task to an auditory task or may change the kind of cognitive task from an auditory task to a visual task on the basis of a following degree and a cognitive task achievement degree. By changing the kind of cognitive task, it is possible to give different kinds of tasks to a user, thereby changing a load on the brain. Note that the visual task is presented by using a display or the like, and the auditory task is presented by using a speaker or the like.

Although an example in which a cognitive task is, for example, a calculation problem or a sentence problem has been described in Embodiment 2, Embodiment 2 is not limited to this. For example, the cognitive task need just be a task that makes brain activity active such as last and first, spot the difference, or a quiz.

Although an example in which the robot 51 includes the cognitive task information database 33 has been described in Embodiment 2, Embodiment 2 is not limited to this. The cognitive task information database 33 is not essential. For example, the robot 51 may be connected to the cognitive task information database 33, for example, over a network.

In Embodiment 2, the adjusting unit 30 may change force driving a rotating member on the basis of a cognitive task achievement degree. For example, the adjusting unit 30 may decrease force driving the rotating member 18 in a case where a cognitive task achievement degree becomes lower than a predetermined threshold value B5, thereby making assist given to the user in a moving direction by movement of the robot 1 smaller. Alternatively, the adjusting unit 30 may adjust the force driving the rotating member 18 so that driving force in a direction opposite to the user's moving direction is generated in the rotating member 18 in a case where a cognitive task achievement degree becomes lower than the predetermined threshold value B4. According to such a configuration, in a case where a cognitive task achievement degree is low, it is possible to prompt a user to walk slowly by increasing a load applied to the user when the user moves while pushing a handle 12 of the robot 51.

Alternatively, the adjusting unit 30 may increase force driving the rotating member 18 in a case where a cognitive task achievement degree becomes lower than the predetermined threshold value B5. A load applied to the user may thus be lessened. Furthermore, the adjusting unit 30 may decrease force driving the rotating member 18 in a case where a cognitive task achievement degree becomes higher than a predetermined threshold value B6. This makes it possible to increase a load applied to the user in a case where a cognitive task achievement degree is high.

Figure 12:
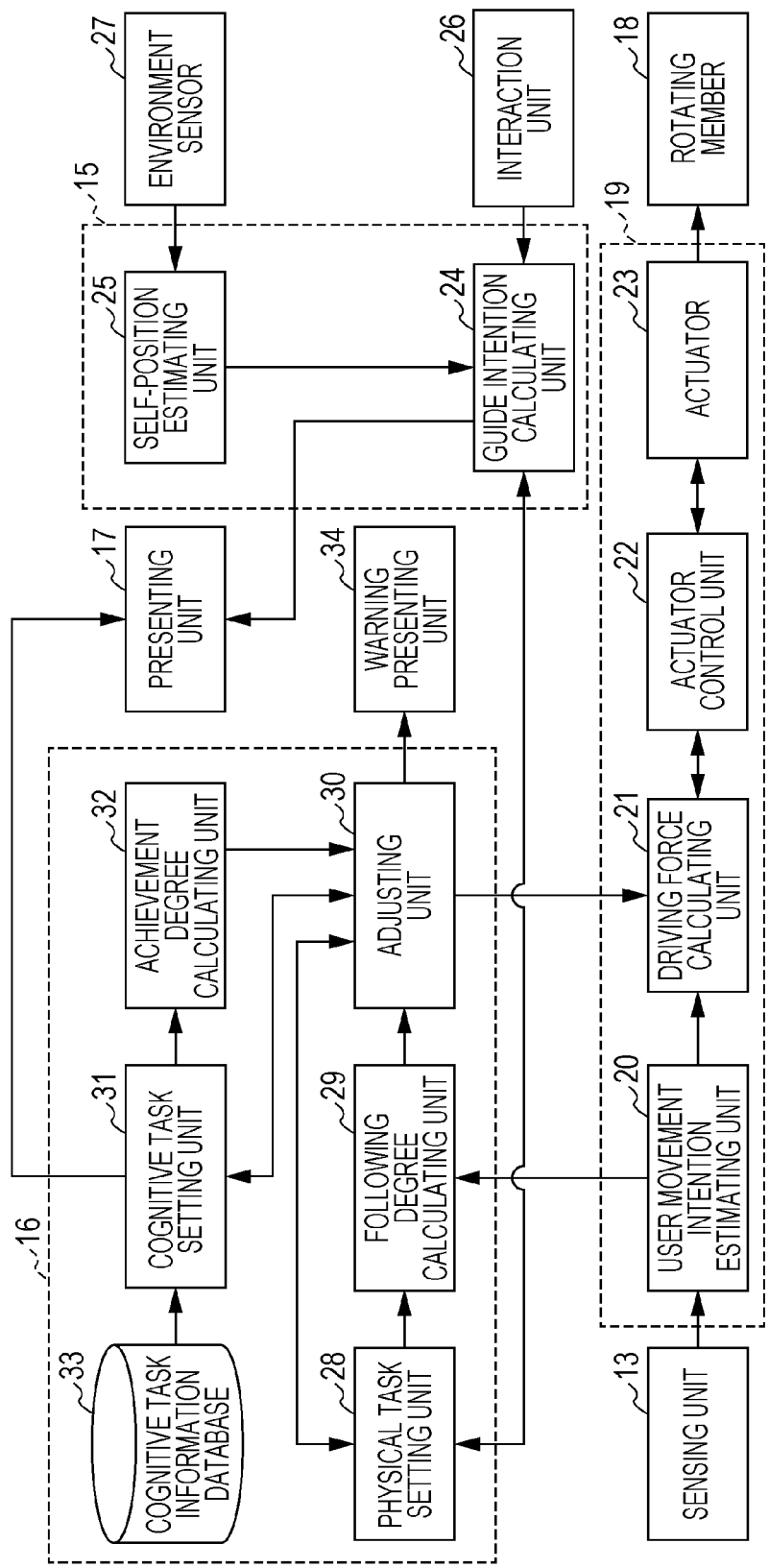
FIG. 12 is a control block diagram illustrating another example of a control configuration for walking support of the walking support robot according to Embodiment 2 of the present disclosure.

In Embodiment 2, the robot 51 may include a warning presenting unit that presents a warning to surroundings on the basis of at least one of a physical task intensity, a degree of difficulty of a cognitive task, a following degree, and a cognitive task achievement degree. FIG. 12 is a control block diagram illustrating another example of a control configuration for walking support of the robot 51. In the other example of the robot 51 illustrated in FIG. 12, the robot 51 includes a warning presenting unit 34.

As illustrated in FIG. 12, the warning presenting unit 34 presents a warning to surroundings on the basis of at least one of a physical task intensity, a degree of difficulty of a cognitive task, a following degree, and a cognitive task achievement degree. The warning presenting unit 34 is connected, for example, to the adjusting unit 30 and can acquire the physical task intensity, the degree of difficulty of the cognitive task, the following degree, and the cognitive task achievement degree from the adjusting unit 30.

In Embodiment 2, the warning presenting unit 34 is, for example, a device that emits light such as an LED. For example, in a case where the physical task intensity is higher than a first threshold value C1, the warning presenting unit 34 estimates that user's movement is disordered and emits light of an alerting color (e.g., red or yellow). In a case where the degree of difficulty of a cognitive task is higher than a second threshold value C2 or a case where the degree of difficulty of the cognitive task is lower than a third threshold value C3, the warning presenting unit 34 estimates that a user moves in an unexpected way and emits light of an alerting color (e.g., red or yellow). In a case where the degree of difficulty of the cognitive task is high and a cognitive task achievement degree is high, the warning presenting unit 34 estimates that the user is walking safely and emits light of a color (e.g., blue or green) indicating safety.

According to such a configuration, in a case where user's walking is not stable, a warning for calling attention can be presented to surroundings of the robot 51, thereby ensuring safety.

Although an example in which the warning presenting unit 34 is a device that emits light such as an LED has been described above, Embodiment 2 is not limited to this. For example, the warning presenting unit 34 may be a speaker that emits warning sound.

The warning presenting unit 34 may acquire information on a physical task intensity from the physical task setting unit 28 and may acquire information on a following degree from the following degree calculating unit 29. The warning presenting unit 34 may acquire information on a degree of difficulty of a cognitive task from the cognitive task setting unit 31 and may acquire information on a cognitive task achievement degree from the achievement degree calculating unit 32.

Embodiment 3

A walking support robot according to Embodiment 3 of the present disclosure is described below. In Embodiment 3, differences from Embodiment 2 are mainly described. In Embodiment 3, constituent elements that are identical or similar to those in Embodiment 2 are given identical reference signs. Furthermore, in Embodiment 3, descriptions similar to those in Embodiment 2 are omitted.

Embodiment 3 is different from Embodiment 2 in that a degree of difficulty of a cognitive task is changed on the basis of information on complexity of an environment.

Control Configuration of Walking Support Robot

Figure 13:
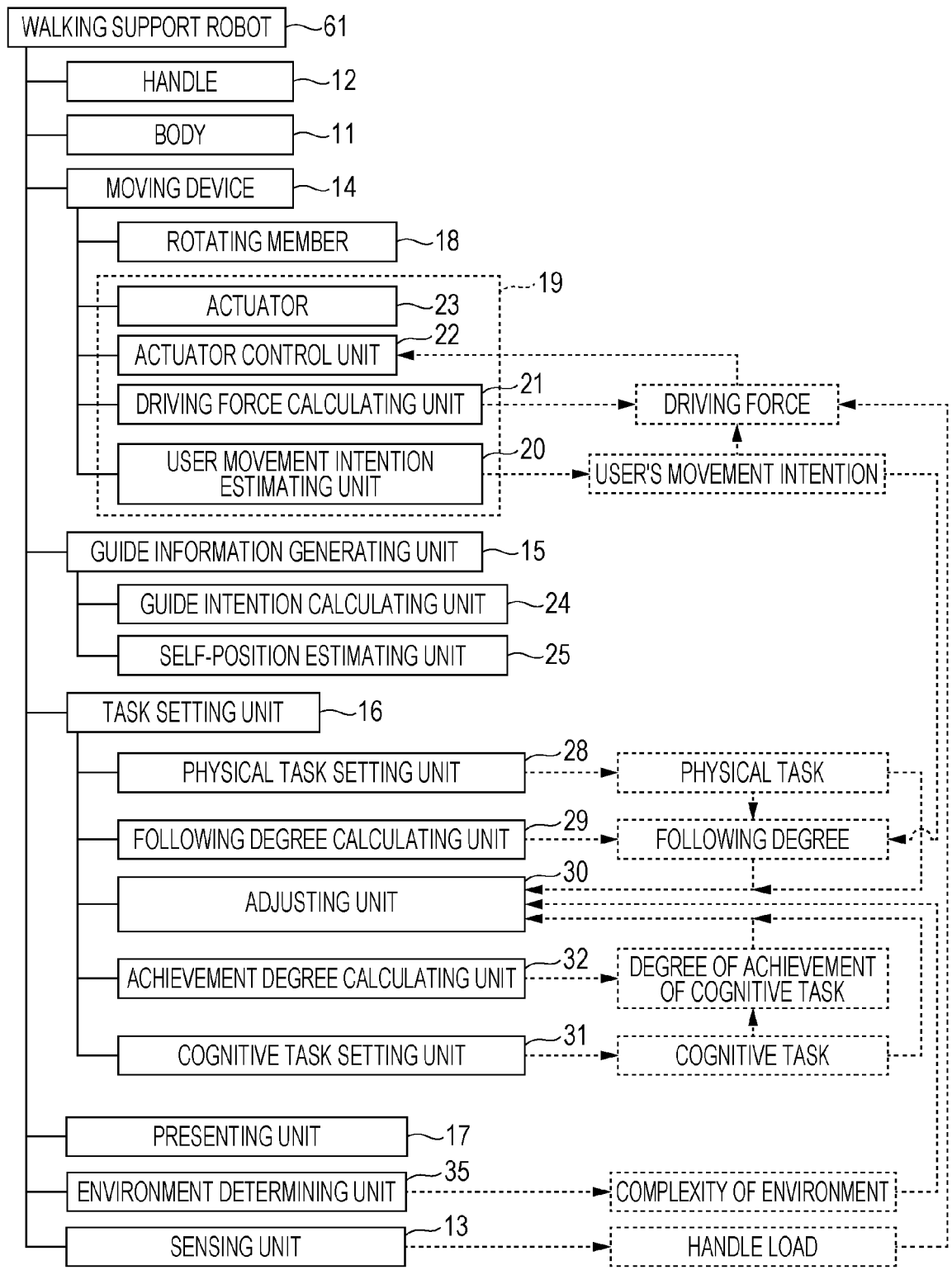
FIG. 13 is a control block diagram illustrating an example of a main control configuration of a walking support robot according to Embodiment 3 of the present disclosure.
Figure 14:
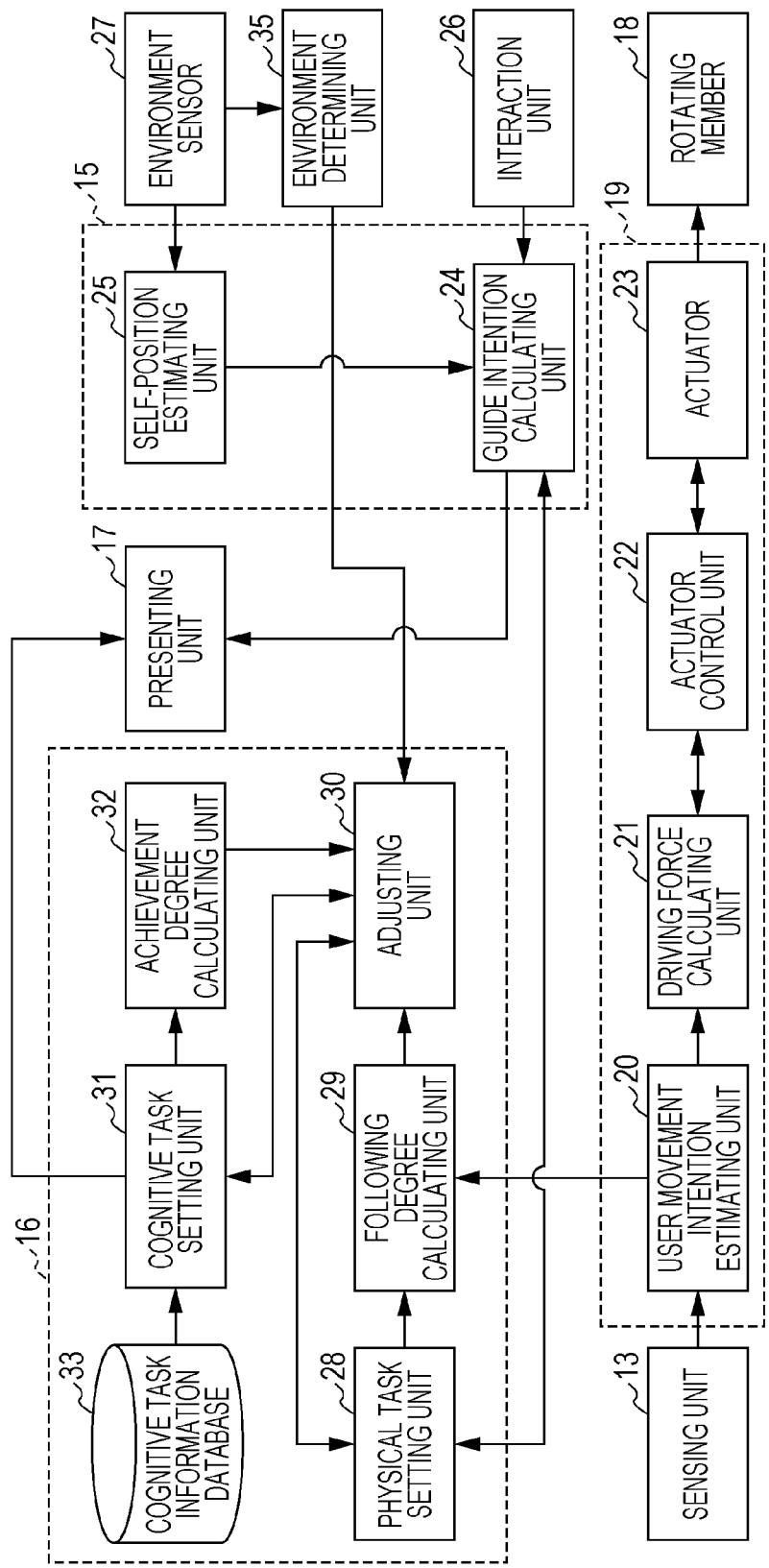
FIG. 14 is a control block diagram illustrating an example of a control configuration for walking support of the walking support robot according to Embodiment 3 of the present disclosure.

FIG. 13 is a control block diagram illustrating an example of a main control configuration of a walking support robot 61 (hereinafter referred to as a "robot 61") according to Embodiment 3. FIG. 14 is a control block diagram illustrating an example of a control configuration for walking support of the robot 61. As illustrated in FIGS. 13 and 14, Embodiment 3 is different from Embodiment 2 in that the robot 61 includes an environment determining unit 35.

The environment determining unit 35 determines complexity of an environment on the basis of information on an environment surrounding the robot 61. Specifically, the environment determining unit 35 determines complexity of an environment on the basis of three-dimensional information and/or visual information of the surrounding environment acquired from an environment sensor 27. For example, the environment determining unit 35 determines complexity of an environment from among ten levels (Levels 1 through 10).

Complexity of an environment includes, for example, the number of obstacles and persons found by laser scanning within a designated area and moving speeds thereof. The designated area is, for example, an area around the robot 61 within an angle of 60 degrees in a travelling direction. Note that the angle of 60 degrees is an example, and the angle is not limited to this.

Complexity of an environment may include, for example, an amount of information in the environment confirmed by using a camera. The amount of information in the environment is, for example, an amount of characters displayed on an object such as a signboard present in the designated area.

Figure 15A:
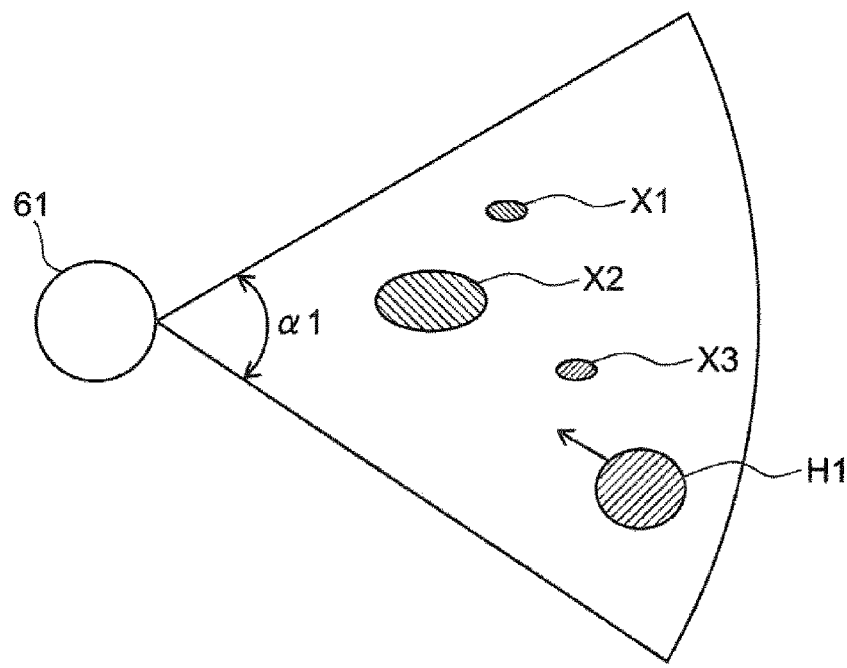
FIG. 15A illustrates an example of environment information.

In Embodiment 3, the environment sensor 27 is a sensor that can acquire three-dimensional information and/or visual information of the surrounding environment. FIG. 15A illustrates an example of environment information. As illustrated in FIG. 15A, the environment sensor 27 acquires, as three-dimensional information, the numbers, positions, moving speeds, and the like of obstacles X1, X2, and X3 and person H1 within the designated area by laser scanning. The designated area illustrated in FIG. 15A is, for example, an area around the robot 61 within an angle α1 in a travelling direction. The angle α1 is, for example, 60 degrees.

Figure 15B:
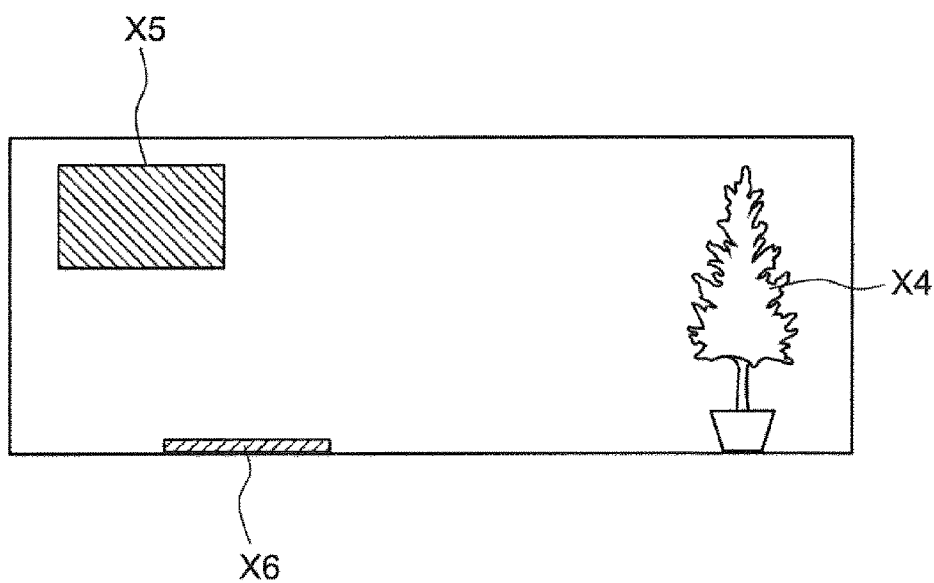
FIG. 15B illustrates another example of environment information.

FIG. 15B illustrates another example of environment information. As illustrated in FIG. 15B, the environment sensor 27 acquires, as visual information, the numbers, positions, sizes, and the like of obstacles X4, X5, and X6 by using a camera.

The environment determining unit 35 determines complexity of an environment on the basis of three-dimensional information illustrated in FIG. 15A and visual information illustrated in FIG. 15B. Alternatively, the environment determining unit 35 determines complexity of an environment on the basis of either the three-dimensional information illustrated in FIG. 15A or the visual information illustrated in FIG. 15B. Information on the complexity of the environment is transmitted to an adjusting unit 30.

The adjusting unit 30 changes a cognitive task on the basis of a following degree, a cognitive task achievement degree, and the complexity of the environment. For example, the adjusting unit 30 lowers a degree of difficulty of a cognitive task in a case where the complexity level of the environment is high (e.g., Levels 8 to 10) and the following degree is lower than a first threshold value D1. Furthermore, the adjusting unit 30 increases the degree of difficulty of the cognitive task in a case where the complexity level of the environment is low (e.g., Levels 1 to 3) and the following degree is higher than a second threshold value D2.

Alternatively, the adjusting unit 30 lowers the degree of difficulty of the cognitive task in a case where the complexity level of the environment is high (e.g., Levels 8 to 10) and a cognitive task achievement degree is lower than a third threshold value D3. Furthermore, the adjusting unit 30 increases the degree of difficulty of the cognitive task in a case where the complexity level of the environment is low (e.g., Levels 1 to 3) and the cognitive task achievement degree is higher than a fourth threshold value D4.

Control of Walking Support Robot

Figure 16:
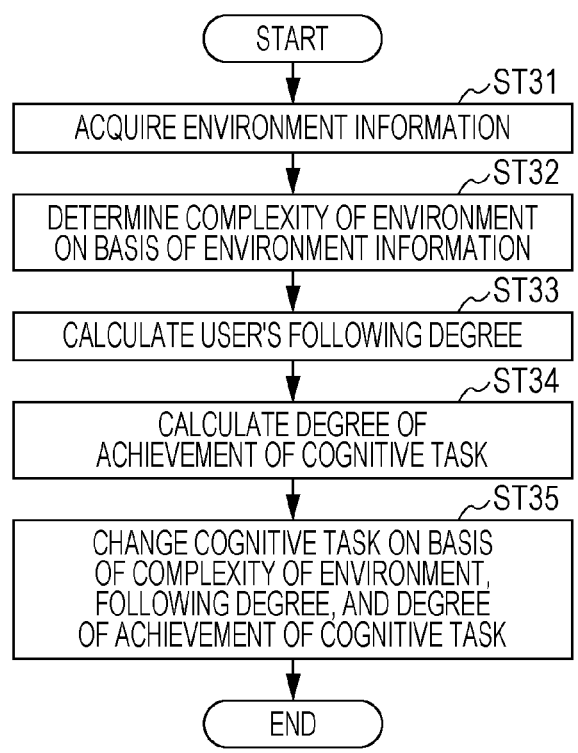
FIG. 16 is an exemplary flowchart of control of the walking support robot according to Embodiment 3 of the present disclosure.

Control of the robot 61 is described with reference to FIG. 16. FIG. 16 is an exemplary flowchart of control of the robot 61.

As illustrated in FIG. 14, in Step ST31, the environment sensor 27 acquires environment information. Specifically, the environment sensor 27 acquires three-dimensional information and/or visual information by laser scanning and/or a camera.

In Step ST32, the environment determining unit 35 determines complexity of an environment on the basis of the environment information. Specifically, the environment determining unit 35 determines a complexity level of the environment on the basis of the three-dimensional information and/or the visual information acquired by the environment sensor 27.

In Step ST33, a following degree calculating unit 29 calculates a following degree to which a user follows a walking route.

In Step ST34, an achievement degree calculating unit 32 calculates a user's cognitive task achievement degree.

In Step ST35, the adjusting unit 30 changes the cognitive task on the basis of the following degree, the cognitive task achievement degree, and the complexity of the environment.

In this way, the robot 61 determines complexity of an environment and supports walking of the user while changing a degree of difficulty of a cognitive task in accordance with the complexity level of the environment.

Effects

According to the walking support robot 61 according to Embodiment 3, it is possible to produce the following effects.

According to the walking support robot 61 according to Embodiment 3, a degree of difficulty of a cognitive task can be adjusted on the basis of complexity of an environment, and therefore a cognitive task of a degree of difficulty corresponding to a surrounding environment can be presented to a user. This makes it possible to more effectively prevent and improve dementia and to increase cognitive attentiveness during walking. The cognitive attentiveness during walking as used herein refers to capability of understanding visual and auditory information (e.g., not overlooking a signboard, predicting someone rushing out) and thereby preventing an accident during walking.

According to the robot 61, in a case where an environment is complicated, concentration of user's consciousness on a cognitive task is lessened by lowering a degree of difficulty of the cognitive task. This allows the user to do multiple tasks, i.e., a physical task and the cognitive task while securing safety during walking even if the environment is complicated.

Furthermore, enhancement of visual processing performance during walking can also be anticipated.

Although an example in which the adjusting unit 30 changes a degree of difficulty of a cognitive task on the basis of a following degree, a cognitive task achievement degree, and complexity of an environment has been described in Embodiment 3, Embodiment 3 is not limited to this. The adjusting unit 30 may change a degree of difficulty of a cognitive task on the basis of only complexity of an environment.

Furthermore, the adjusting unit 30 may change the kind of cognitive task on the basis of a following degree, a cognitive task achievement degree, and complexity of an environment. For example, the adjusting unit 30 may change a cognitive task from an auditory task to a visual task in a case where a complexity level of an environment is low (e.g., Levels 1 to 3). Furthermore, the adjusting unit 30 may change the cognitive task from a visual task to an auditory task in a case where the complexity level of the environment is high (e.g., Levels 8 to 10). By thus changing the kind of cognitive task in accordance with complexity of an environment, it is possible to change a load applied to the brain, thereby further improving cognitive attentiveness during walking.

In Embodiment 3, the adjusting unit 30 may change force driving a rotating member on the basis of a complexity level of an environment. For example, the adjusting unit 30 may decrease force for driving a rotating member 18 in a case where a complexity level of an environment becomes higher than Level 7. Assist given to a user in a moving direction by movement of the robot 61 may be thus decreased. Alternatively, the adjusting unit 30 may adjust force driving the rotating member 18 so that driving force in a direction opposite to a user's moving direction is generated in the rotating member 18 in a case where a complexity level of an environment becomes higher than Level 7. According to such a configuration, in a case where a complexity level of an environment is high, it is possible to prompt a user to walk slowly by increasing a load applied to the user when the user moves while pushing a handle 12 of the robot 61.

Alternatively, the adjusting unit 30 may increase force driving the rotating member 18 in a case where a complexity level of an environment becomes lower than Level 4. A load applied to a user may thus be lessened. Alternatively, the adjusting unit 30 may decrease force driving the rotating member 18 in a case where a complexity level of an environment becomes lower than Level 4. This makes it possible to increase a load applied to a user in a case where the complexity level of the environment is low.

Although the number of obstacles and persons found by laser scanning within a designated area and moving speeds thereof and an amount of information in an environment confirmed by using a camera have been described as examples of complexity of the environment in Embodiment 3, Embodiment 3 is not limited to this. Complexity of an environment is complexity of an environment surrounding the robot 61 and may be other kinds of information.

Embodiment 4

A walking support system according to Embodiment 4 of the present disclosure is described below. In Embodiment 4, constituent elements that are identical or similar to those in Embodiment 3 are given identical reference signs. In Embodiment 4, descriptions similar to those in Embodiment 3 are omitted.

Overall Configuration

Figure 17:
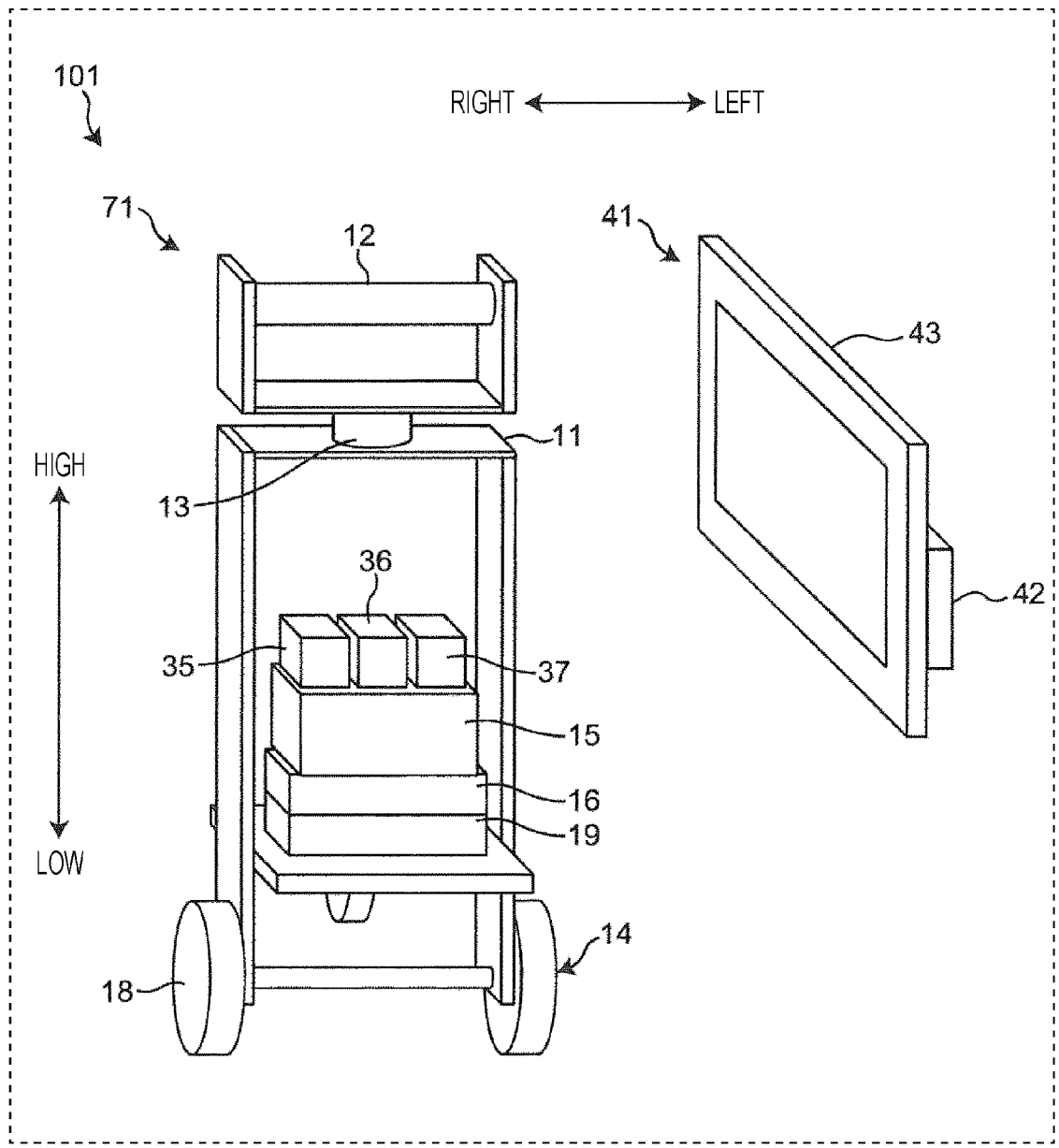
FIG. 17 illustrates an overall walking support system according to Embodiment 4 of the present disclosure.

FIG. 17 illustrates external appearance of a walking support system 101 (hereinafter referred to as a "system 101") according to Embodiment 4.

As illustrated in FIG. 17, the system 101 includes a walking support robot 71 (hereinafter referred to as a "robot 71") and one or more presenting devices 41. In Embodiment 4, the robot 71 and the one or more presenting devices 41 are connected over a network.

In the system 101 according to Embodiment 4, the presenting device 41 disposed on an environment side presents presented information generated on the basis of guide information for guiding a user generated by the robot 71 and a cognitive task.

Walking Support Robot

The robot 71 is a robot that moves in accordance with a handle load applied by a user while guiding the user to a destination. The robot 71 according to Embodiment 4 is different from the robot 61 according to Embodiment 3 in that the robot 71 includes a presentation control unit 36 that controls presented information and information on a cognitive task and a first communication unit 37 that transmits the presented information and the information on the cognitive task over the network and includes no presenting unit. Except for these points, the robot 71 according to Embodiment 4 has a similar configuration to the robot 61 according to Embodiment 3.

Presenting Device

The presenting device 41 is a device that presents presented information and a cognitive task. The presenting device 41 includes a second communication unit 42 that receives presented information and information on a cognitive task over the network and a presenting unit 43 that presents the presented information and the cognitive task.

Control Configuration of Walking Support System

Figure 18:
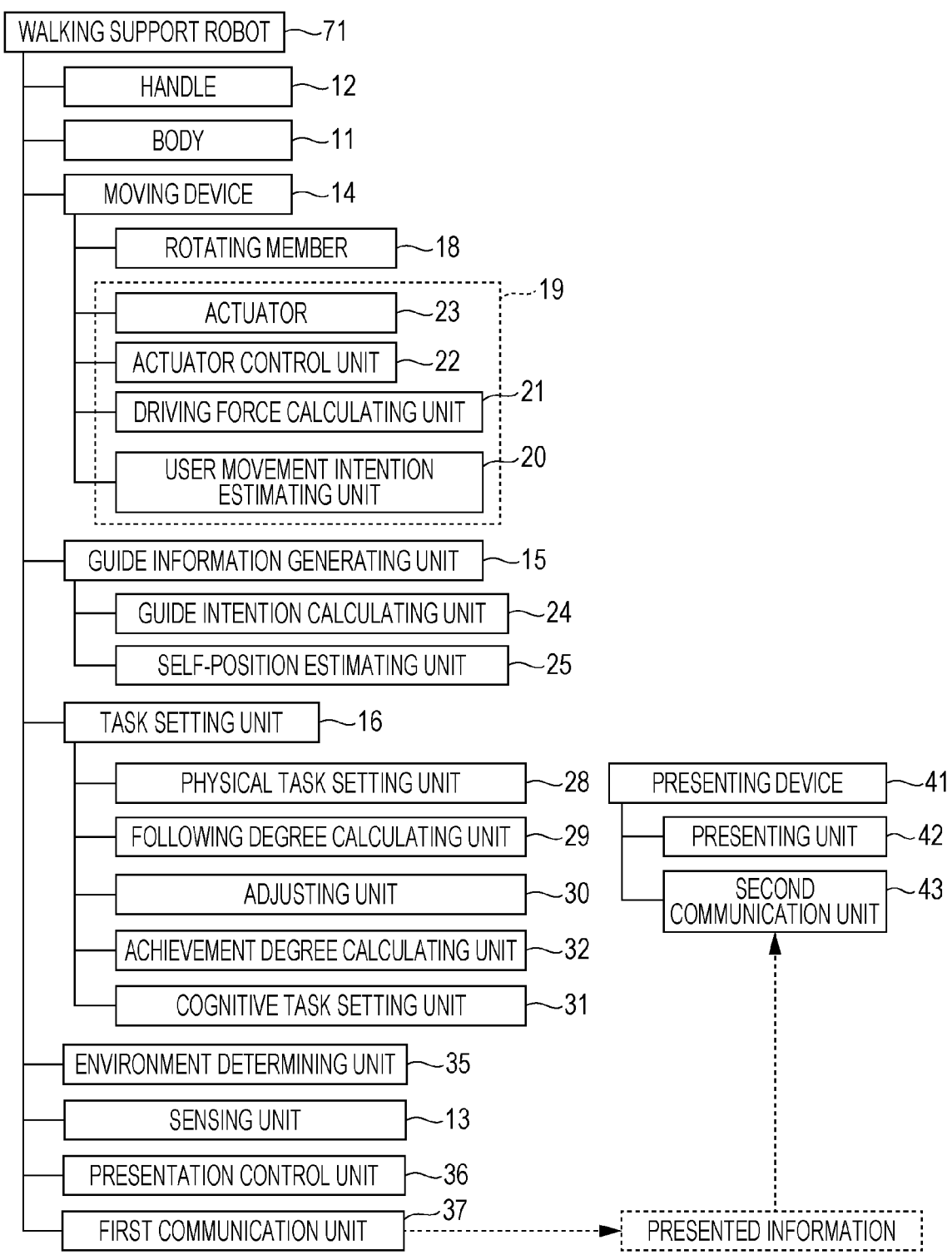
FIG. 18 is a control block diagram illustrating an example of a main control configuration in the walking support system according to Embodiment 4 of the present disclosure.
Figure 19:
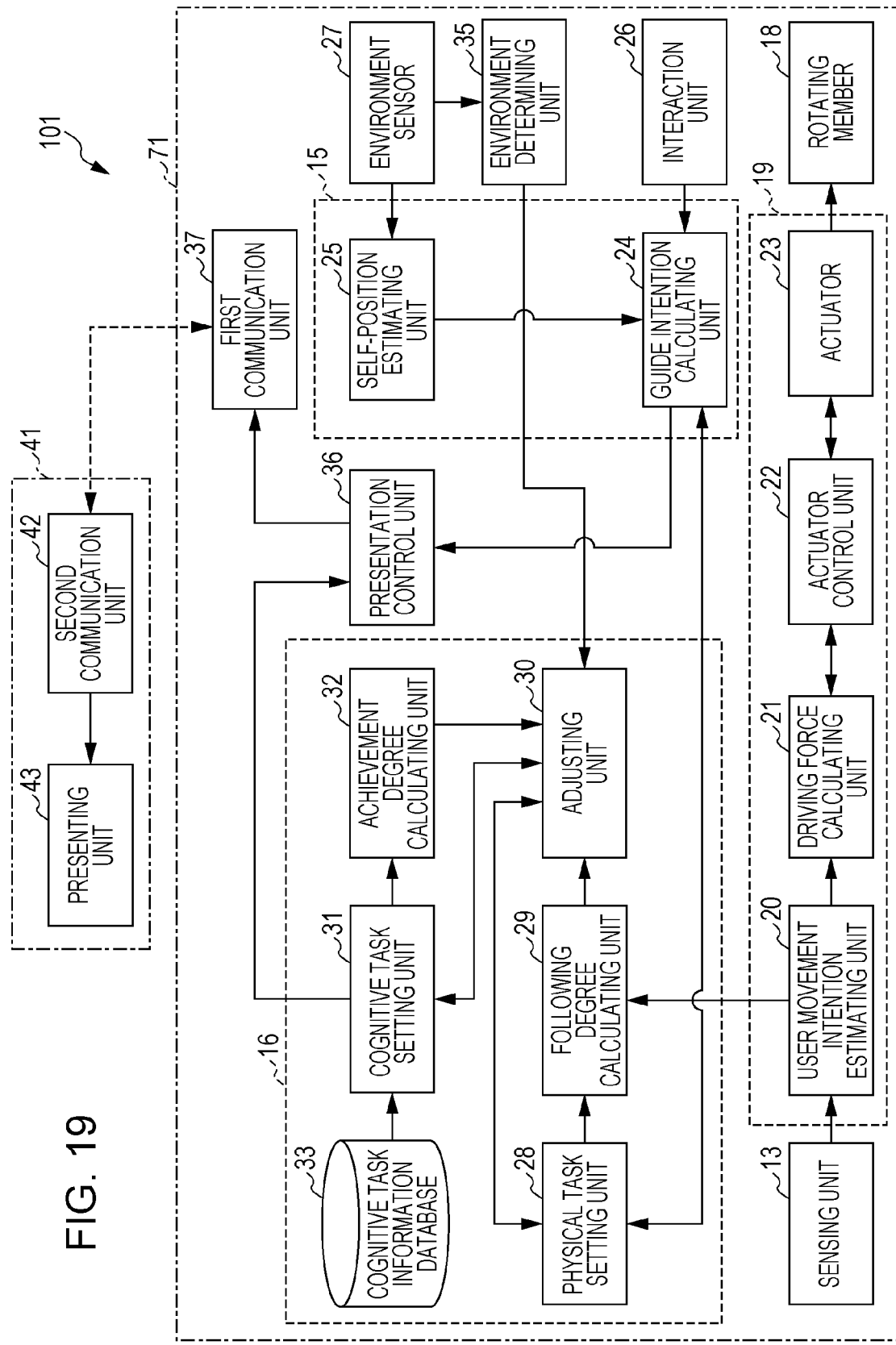
FIG. 19 is a control block diagram illustrating an example of a control configuration for walking support of a walking support robot according to Embodiment 4 of the present disclosure.

FIG. 18 is a control block diagram illustrating an example of a main control configuration in the system 101. FIG. 19 is a control block diagram illustrating an example of a control configuration for walking support of the system 101.

As illustrated in FIGS. 18 and 19, the presentation control unit 36 acquires, as guide information, information such as a guide direction, a guide distance, and a period of guide from a guide information generating unit 15 and generates presented information presented by the presenting device 41. Furthermore, the presentation control unit 36 acquires information on a cognitive task from a cognitive task setting unit 31, The presentation control unit 36 transmits the presented information and information on the cognitive task to the first communication unit 37.

The presentation control unit 36 has a function of sensing the presenting device 41. For example, the presentation control unit 36 senses the presenting device 41 present within a predetermined distance from the robot 71. The presentation control unit 36 controls the presented information and the information on the cognitive task in accordance with a position, a direction, and the like of the sensed presenting device 41. The predetermined distance as used herein refers to a distance within which at least the robot 71 and the presenting device 41 can communicate with each other over the network.

The following describes a case where a plurality of presenting devices 41 are present at different places within a predetermined distance from the robot 71, for example, a case where the presenting device 41 is disposed right before and right after a right-hand curve on a right-hand-curving path within the predetermined distance from the robot 71.

In a case where the robot 71 wants to guide a user to turn along the right-hand curve, "presented information for guiding in a clockwise direction" is presented on the presenting device 41 right before the curve. Meanwhile, for example, "presented information for guiding in a forward direction" is presented on the presenting device 41 right after the curve since the user watches or hears the presented information after finishing the turn in the clockwise direction.

As described above, the presentation control unit 36 changes presented information in accordance with the position and the like of the presenting device 41.

The first communication unit 37 transmits presented information and information on a cognitive task over the network. Specifically, the first communication unit 37 transmits, to the presenting device 41, presented information generated by the presentation control unit 36 and information on a cognitive task set by the cognitive task setting unit 31 over the network. The transmitted presented information and information on the cognitive task are presented by the presenting device 41.

The first communication unit 37 receives positional information of the presenting device 41 over the network. The first communication unit 37 transmits the positional information of the presenting device 41 to the presentation control unit 36. The presentation control unit 36 senses the presenting device 41 present within a predetermined distance from the robot 71 on the basis of the positional information of the presenting device 41.

The presenting device 41 is disposed on an environment side and presents the presented information and the information on the cognitive task received from the first communication unit 37 of the robot 71. The presenting device 41 includes the second communication unit 42 and the presenting unit 43.

The second communication unit 42 receives the presented information and the information on the cognitive task over the network. Specifically, the second communication unit 42 receives the presented information and the information on the cognitive task transmitted from the first communication unit 37 over the network.

Furthermore, the second communication unit 42 transmits the positional information of the presenting device 41 to the first communication unit 37 over the network.

The presenting unit 43 presents the presented information and the information on the cognitive task received by the second communication unit 42. The presenting unit 43 presents the presented information and the information on the cognitive task, for example, by using sound and/or an image. The presenting unit 43 includes, for example, a speaker and/or a display.

Control of Walking Support System

Figure 20:
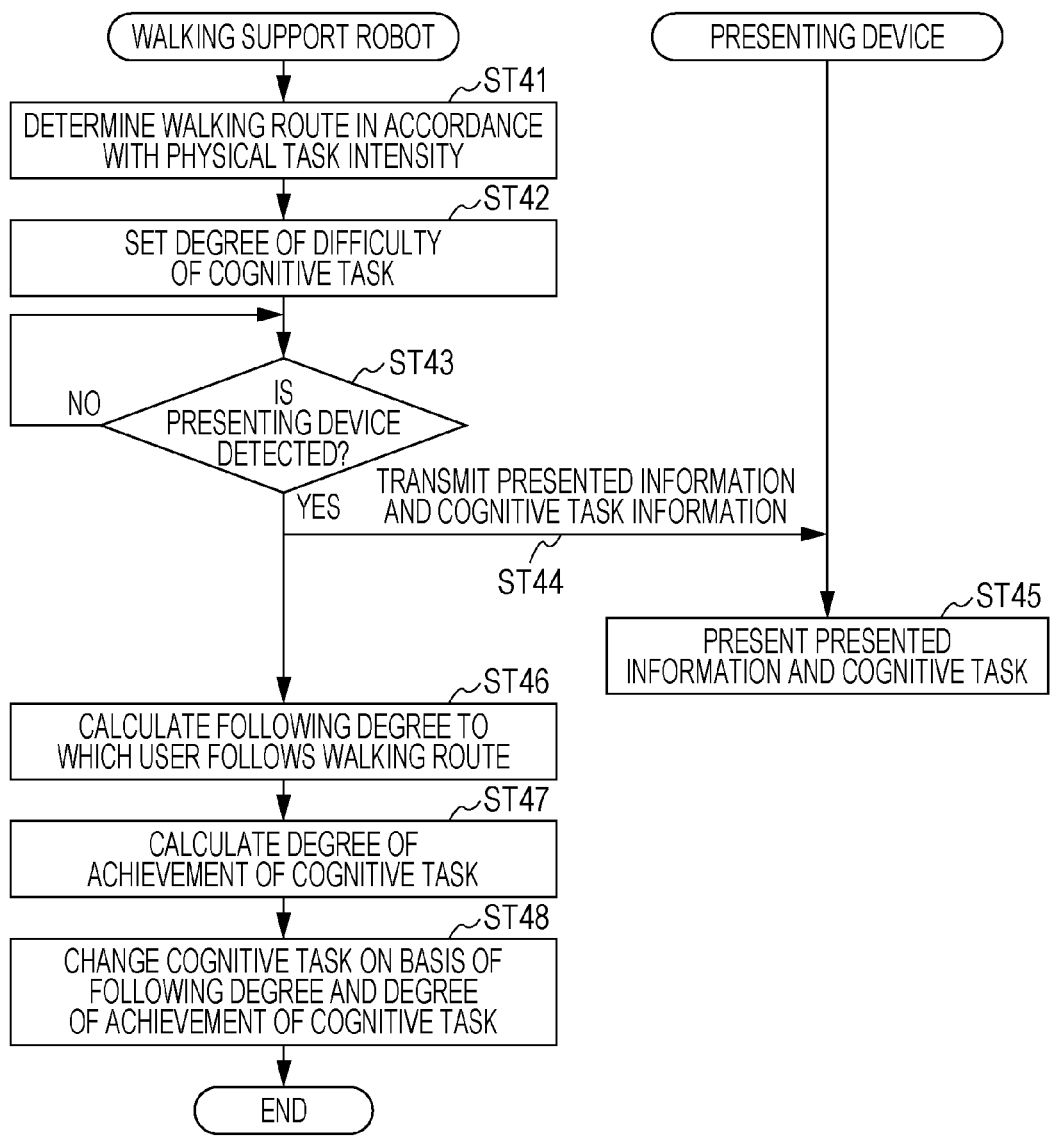
FIG. 20 is an exemplary flowchart of control of the walking support robot according to Embodiment 4 of the present disclosure.

Control of the system 101 is described with reference to FIG. 20. FIG. 20 is an exemplary flowchart of control of the system 101. Note that description of steps similar to those in the control described in Embodiments 1 through 3 is simplified.

As illustrated in FIG. 20, in Step ST41, a physical task setting unit 28 determines a walking route in accordance with a physical task intensity.

In Step ST42, the cognitive task setting unit 31 sets a degree of difficulty of a cognitive task.

In Step ST43, the presentation control unit 36 determines whether or not the presenting device 41 has been sensed. Specifically, the presentation control unit 36 determines whether or not the presenting device 41 is present within a predetermined distance from the robot 71 on the basis of positional information of the presenting device 41 acquired by the first communication unit 37.

In a case where the presenting device 41 is present within the predetermined distance, the robot 71 performs the process in Step ST44 and proceeds to Step ST46. In a case where no presenting device 41 is present within the predetermined distance, Step ST43 is repeated.

In Step ST44, the first communication unit 37 transmits presented information and information on the cognitive task over the network.

In Step ST45, the presenting device 41 presents the presented information and the cognitive task. Specifically, the second communication unit 42 receives the presented information and the information on the cognitive task transmitted in Step ST44 over the network. Next, the presenting unit 43 presents the presented information and the cognitive task on the basis of the received presented information and information on the cognitive task.

A user using the robot 71 walks in accordance with the presented information presented on the one or more presenting devices 41 disposed on a walking route and is thus guided to a destination along the walking route. Furthermore, the user is given the cognitive task by the presenting device 41 during walking.

In Step ST46, a following degree calculating unit 29 calculates a following degree to which the user follows the walking route.

In Step ST47, an achievement degree calculating unit 32 calculates a user's cognitive task achievement degree.

In Step ST48, an adjusting unit 30 changes the cognitive task on the basis of the following degree and the cognitive task achievement degree.

In this way, in the system 101, user's walking is supported by causing the presenting device 41 disposed on an environment side to present presented information and a cognitive task.

FIG. 21A illustrates an example of walking support control of the system 101. As illustrated in FIG. 21A, in the system 101, a plurality of presenting devices 41a, 41b, and 41c are disposed on a walking route R3. When a user using the robot 71 comes close to the presenting device 41a disposed right before a right-hand curve, the presenting device 41a displays a message "turn right" on the basis of guide information. When the user comes close to the presenting device 41b disposed right before a left-hand curve, the presenting device 41b displays a message "turn left" on the basis of the guide information. When the user comes close to the presenting device 41c disposed on a straight path, the presenting device 41c displays a message "go straight".

In this way, in the system 101, when the user using the robot 71 comes close to the presenting devices 41a, 41b, and 41c, presented information is presented on the basis of the guide information.

Figure 21B:
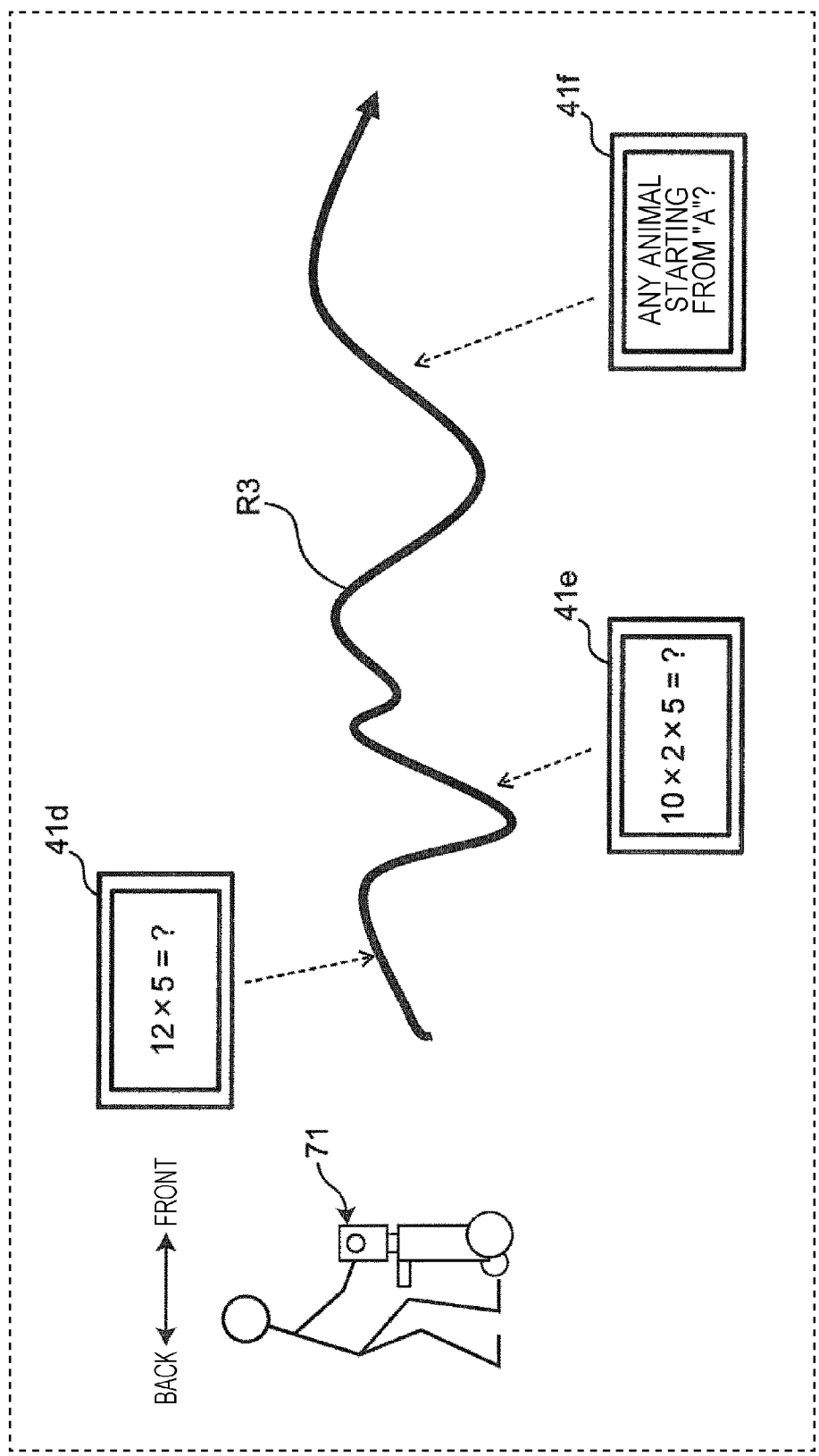
FIG. 21B illustrates another example of walking support control of the walking support system according to Embodiment 4 of the present disclosure.

FIG. 21B illustrates another example of walking support control of the system 101. As illustrated in FIG. 21B, in the system 101, a plurality of presenting devices 41d, 41e, and 41f are disposed on a walking route R3. When a user using the robot 71 comes close to the presenting device 41d, the presenting device 41d displays a cognitive task "12×5=?" on the basis of cognitive task information. Similarly, when the user comes close to the presenting devices 41e and 41f, the presenting devices 41e and 41f display cognitive tasks "10×2 5=?" and "any animal starting from "A"?", respectively.

In this way, in the system 101, when the user using the robot 71 comes close to the presenting devices 41d, 41e, and 41f, a cognitive task is presented on the basis of cognitive task information.

In the examples illustrated in FIGS. 21A and 21B, the presenting device 41 separately presents presented information and a cognitive task. However, Embodiment 4 is not limited to this. The presenting device 41 may present presented information and a cognitive task together.

Effects

According to the walking support system 101 according to Embodiment 4, it is possible to produce the following effects.

According to the walking support system 101 according to Embodiment 4, it is possible to create confliction between a physical task and a cognitive task, thereby making it possible to effectively improve physical performance and prevent and improve dementia. Furthermore, by disposing the presenting device 41 on an environment side, user's consciousness is directed toward the environment side, and therefore the user can be given a task in a way closer to an actual world. Furthermore, since the user walks along a walking route while checking presented information presented on the presenting device 41 disposed on the environment side, a visual load can be applied to the user in addition to a physical task and a cognitive task.

Furthermore, in a case where a complicated route is set, a user can do a physical task using various physical functions related to walking in addition to exercise of walking along a monotonous route. This produces another effect of enhancing not only cardiorespiratory capacity and muscular strength for walking itself during walking in various environments in an actual world, but also walking performance that allows a person to properly move his or her body in response to events during actual walking such as a rough road, an obstacle, and a complicated route.

Furthermore, enhancement of physical performance for properly executing a physical task even in a situation where a cognitive load is present such as a case where processing of information on a surrounding environment during walking or processing of information during walking is needed.

Furthermore, enhancement of visual processing performance during walking is also anticipated.

Although an example in which the robot 71 has a similar configuration to the robot 61 according to Embodiment 3 except for that the robot 71 includes the presentation control unit 36 and the first communication unit 37 and includes no presenting unit has been described in Embodiment 4, Embodiment 4 is not limited to this. The robot 71 according to the Embodiment 4 may have a similar configuration to the robots 1 and 51 according to Embodiments 1 and 2 except for that the robot 71 includes the presentation control unit 36 and the first communication unit 37 and includes no presenting unit.

Although an example in which the presenting device 41 presents presented information for guiding a user and a cognitive task has been described in Embodiment 4. Embodiment 4 is not limited to this. For example, the presenting device 41 may present only presented information.

Although an example in which the presenting unit 43 includes a speaker, a display, and/or the like has been described in Embodiment 4, Embodiment 4 is not limited to this. For example, the presenting unit 43 may be, for example, a projector that can project an image on a surrounding environment.

Although the system 101 in which the robot 71 and one or more presenting devices 41 are connected over the network has been described as an example in Embodiment 4, Embodiment 4 is not limited to this. At least part of control of the robot 71 may be performed, for example, by a server connected to the network.

For example, processes such as setting of a physical task intensity, setting of a cognitive task, determination of complexity of an environment, generation of guide information, estimation of a user's movement intention, calculation of driving force, and control of presented information may be performed in an external computer such as a server. In this case, the robot 71 and the presenting device 41 acquire information from the server.

Embodiment 5

A walking support system according to Embodiment 5 of the present disclosure is described below. In Embodiment 5, differences from Embodiment 4 are mainly described. In Embodiment 5, constituent elements that are identical or similar to those in Embodiment 4 are given identical reference signs. In Embodiment 5, descriptions similar to those in Embodiment 4 are omitted.

Embodiment 5 is different from Embodiment 4 in that a robot autonomously moves so as to guide a user to a destination and that a following degree to which the user follows a walking route is calculated on the basis of a difference between a robot's guide intention and a user's guide intention.

Control Configuration of Walking Support System

Figure 22:
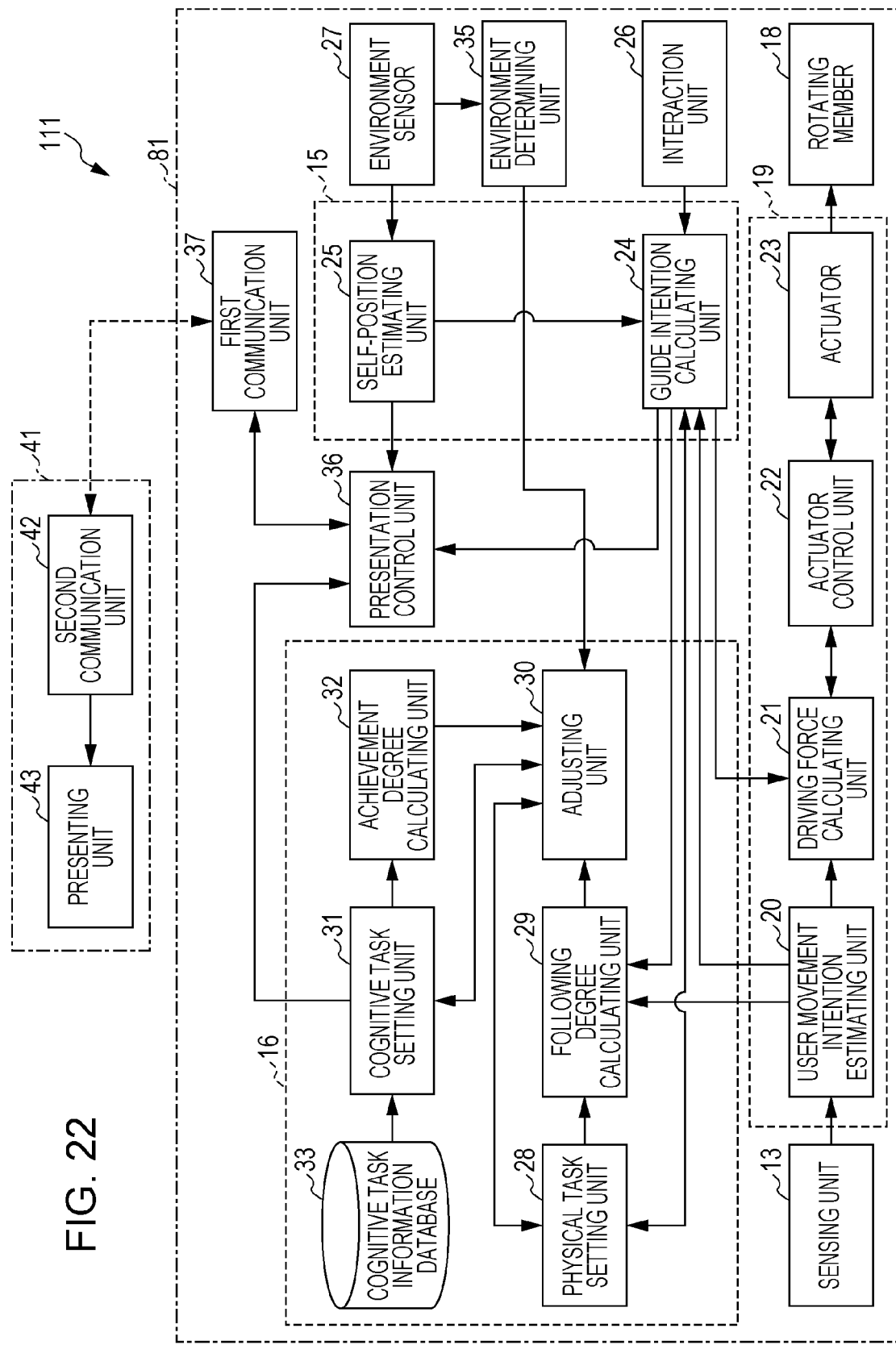
FIG. 22 is a control block diagram illustrating an example of a control configuration for walking support of a walking support robot according to Embodiment 5 of the present disclosure.

FIG. 22 is a control block diagram illustrating an example of a control configuration for walking support of a walking support system 111 (hereinafter referred to as a "system 111") according to Embodiment 5. As illustrated in FIG. 22, Embodiment 5 is different from Embodiment 4 in that a guide intention calculating unit 24 is connected to a user movement intention estimating unit 20, a driving force calculating unit 21, and a following degree calculating unit 29.

In Embodiment 4, the guide intention calculating unit 24 calculates a guide intention (a guide direction and a guide speed) of a robot 81. Specifically, the guide intention calculating unit 24 calculates a guide direction on the basis of destination information, self-position information of the robot 81, map information, and task information supplied from a task setting unit 16. Furthermore, the guide intention calculating unit 24 calculates a guide speed on the basis of a speed that is input in advance or information on a user. Calculation of a guide intention is not limited to these methods.

The guide intention calculating unit 24 transmits the calculated guide intention to the driving force calculating unit 21. The driving force calculating unit 21 calculates driving force on the basis of the guide intention and drives the robot 81. In this way, the robot 81 autonomously moves along a walking route so as to guide the user.

In a case where the user moves in a direction different from the guide direction while the robot 81 is guiding the user, the robot 81 moves in accordance with the user's movement intention. For example, the user movement intention estimating unit 20 estimates a user's movement intention (a moving direction and a moving speed) while the robot 81 is guiding the user. In a case where the user's movement intention is different from the guide intention of the robot 81, the driving force calculating unit 21 calculates driving force on the basis of the user's movement intention and moves the robot 81. The case where the users movement intention is different from the guide intention of the robot 81 is, for example, a case where the moving direction is different from the guide direction and the user is moving in the moving direction at a moving speed equal to or higher than a predetermined threshold value.

The robot 81 autonomously moves on the basis of information on a user's movement intention (a moving direction and a moving speed) estimated by the user movement intention estimating unit 20. Specifically, the robot 81 starts autonomous movement when the user starts moving in the same direction as a guide direction at a moving speed equal to or higher than a predetermined threshold value.

For example, in a case where the user is moving in a direction different from the guide direction of the robot 81, i.e., in a case where the user's movement intention is different from the guide intention of the robot 81, the robot 81 moves in accordance with the user's movement intention. Next, in a case where the user is moving in the same direction as the guide direction of the robot 81, i.e., in a case where the user's movement intention is the same as the guide intention of the robot 81, the robot 81 moves in accordance with the guide intention.

Furthermore, the following degree calculating unit 29 calculates a following degree to which the user follows a walking route on the basis of a difference between the guide intention and the users movement intention.

Control of Walking Support System

Control of the system 101 is described with reference to FIG. 23. FIG. 23 is an exemplary flowchart of control of the system 101. In Embodiment 5, setting of a physical task and a cognitive task is similar to that in Embodiment 4, and therefore description thereof is omitted.

As illustrated in FIG. 23, in Step ST51, the guide intention calculating unit 24 determines a guide speed on the basis of a users movement intention. Specifically, the guide intention calculating unit 24 calculates a guide speed in accordance with a user's moving speed. For example, the guide intention calculating unit 24 sets the guide speed to a speed nearly equal to the user's moving speed.

In Step ST52, the guide intention calculating unit 24 determines a guide direction on the basis of destination information, self-position information of the robot 81, map information, and information on a walking route supplied from the task setting unit 16.

In Step ST53, a moving device 14 moves the robot 81 on the basis of the determined guide intention. Specifically, the driving force calculating unit 21 calculates driving force on the basis of the guide intention (the guide direction and the guide speed) calculated by the guide intention calculating unit 24. An actuator 23 drives a rotating member 18 to rotate on the basis of the calculated driving force. In this way, the robot 81 autonomously moves so as to guide the user to a destination along a walking route.

In Step ST54, a presentation control unit 36 determines whether or not a presenting device 41 has been sensed. Specifically, the presentation control unit 36 determines whether or not the presenting device 41 is present within a predetermined distance from the robot 81 on the basis of positional information of the presenting device 41 acquired by a first communication unit 37.

In a case where the presenting device 41 is present within the predetermined distance, the robot 81 performs the process in Step ST55 and proceeds to Step ST57. In a case where no presenting device 41 is present within the predetermined distance, Step ST54 is repeated.

In Step ST55, the first communication unit 37 transmits presented information and information on a cognitive task over a network.

In Step ST56, the presenting device 41 presents the presented information and the cognitive task. Specifically, a second communication unit 42 receives the presented information and the information on the cognitive task transmitted in Step ST55 over the network. Next, the presenting unit 43 presents the presented information and the cognitive task on the basis of the received presented information and information on the cognitive task.

In Step ST57, the following degree calculating unit 29 calculates a following degree to which the user follows a walking route on the basis of a difference between the users movement intention and the guide intention of the robot 81. Specifically, the following degree calculating unit 29 determines that the user is moving in a direction different from the walking route in a case where the users moving direction is different from the guide direction of the robot 81 and where a difference between the moving speed and the guide speed is equal to or larger than a predetermined threshold value. Next, the following degree calculating unit 29 calculates a distance over which the user is not following the walking route by calculating a distance over which the user has moved in the direction different from the walking route. The following degree calculating unit 29 calculates a following degree to which the user is following the walking route on the basis of the distance over which the user is not following the walking route. Specifically, the following degree calculating unit 29 calculates the user's following degree by using a calculation formula: (the distance over which the user has walked)−(the distance over which the user is not following the walking route)/(the distance over which the user has walked)×100.

In Step ST58, an adjusting unit 30 changes a physical task and a cognitive task on the basis of the following degree. For example, the adjusting unit 30 changes a physical task intensity, a degree of difficulty of a cognitive task, and the kind of cognitive task on the basis of the following degree.

Effects

According to the walking support system 111 according to Embodiment 5, it is possible to produce the following effects.

According to the walking support system 111 according to Embodiment 5, the robot 81 itself can autonomously move along a walking route and guide a user, and a following degree can be calculated on the basis of a difference between a guide intention of the robot 81 and a user's movement intention.

Furthermore, in a case where a complicated route is set, a user can do a physical task using various physical functions related to walking in addition to exercise of walking along a monotonous route. This produces another effect of enhancing not only cardiorespiratory capacity and muscular strength for walking itself during walking in various environments in an actual world, but also walking performance that allows a person to properly move his or her body in response to events during actual walking such as a rough road, an obstacle, and a complicated route.

Furthermore, enhancement of physical performance for properly executing a physical task even in a situation where a cognitive load is present such as a case where processing of information on a surrounding environment during walking or processing of information during walking is needed.

Furthermore, enhancement of visual processing performance during walking is also anticipated.

Although an example in which the guide intention calculating unit 24 sets a guide speed to a speed nearly equal to a user's moving speed has been described in Embodiment 5, Embodiment 5 is not limited to this. For example, the guide intention calculating unit 24 may determine the guide speed on the basis of information on a user stored in a storage unit.

Although an example in which start of guide based on autonomous movement of the robot 81 is triggered by a user's movement intention has been described in Embodiment 5, Embodiment 5 is not limited to this. For example, the robot 81 may start guide when a user selects a "guide start" button with the use of an interaction unit 26.

The present disclosure has been described in each embodiment in some degree of detail, but the disclosure in these embodiments may be changed in a detail of a configuration. Furthermore, a combination of elements and a change of order in each embodiment can be realized without departing from the scope and idea of the present disclosure.

The present disclosure is applicable to a walking support robot and a walking support system that can improve physical performance while supporting users walking.

What is claimed is:

1. A walking support robot, comprising:
    a body;
    a handle that is on the body and configured to be held by a user;
    a sensor that senses a load applied to the handle;
    at least one wheel that moves the walking support robot; and
    a processor that, in operation, performs operations including:
        controlling rotation of the at least one wheel in accordance with the load sensed by the sensor;
        generating guide information for guiding the user to walk along a walking route,
        presenting presented information for guiding the user on a basis of the guide information;
        setting a physical task by adjusting complexity of the walking route;
        calculating a following degree to which the user follows the walking route based on a difference between a distance which the user has walked along the walking route and a distance which the user has moved in a direction different than the walking route; and
        changing an intensity of the physical task on a basis of the following degree,
    wherein, in the changing, a force opposite to a moving direction is generated in the at least one wheel in a case where the following degree is lower than a first predetermined threshold value.

2. The walking support robot according to claim 1, wherein
    the operations further include changing a force controlling the rotation of the at least one wheel on the basis of the following degree.

3. The walking support robot according to claim 1, wherein
    the operations further include:
        setting a cognitive task;
        presenting the cognitive task;
        determining a cognitive task achievement degree of the user; and
        changing the cognitive task on a basis of the cognitive task achievement degree.

4. The walking support robot according to claim 3, wherein
    the operations further include:
        lowering a degree of difficulty of the cognitive task in a case where the cognitive task achievement degree is lower than a second predetermined threshold value; and
        increasing the degree of difficulty of the cognitive task in a case where the cognitive task achievement degree is higher than a third predetermined threshold value.

5. The walking support robot according to claim 3, wherein
    the operations further include:
        lowering a degree of difficulty of the cognitive task in a case where the following degree is lower than a second predetermined threshold value; and
        increasing the degree of difficulty of the cognitive task in a case where the following degree is higher than a third predetermined threshold value.

6. The walking support robot according to claim 3, wherein
    the operations further include changing the intensity of the physical task further on the basis of the cognitive task achievement degree.

7. The walking support robot according to claim 3, wherein
    the operations further include:
        determining complexity of an environment surrounding the walking support robot; and
        changing the cognitive task further on a basis of the complexity of the environment.

8. The walking support robot according to claim 7, wherein
    the operations further include changing a kind of the cognitive task presented by the presenting of the cognitive task on the basis of the complexity of the environment.

9. The walking support robot according to claim 3, wherein
    the operations further include presenting the cognitive task on a basis of a change of the load applied to the handle.

10. The walking support robot according to claim 3, further comprising:
    a warning device,
    wherein the operations further include causing the warning device to present a warning on a basis of at least one of the intensity of the physical task, a degree of difficulty of the cognitive task, the following degree, and the cognitive task achievement degree.

11. The walking support robot according to claim 3, wherein
    the operations further include:
        accumulating history information on the following degree and the cognitive task achievement degree; and
        changing at least one of the intensity of the physical task and a degree of difficulty of the cognitive task on a basis of the history information.

12. A walking support system, comprising:
    a walking support robot; and
    a presenting device, the presenting device and the walking support robot being connected over a network, wherein the walking support robot includes:
  a body;
  a handle that is on the body and configured to be held by a user;
  a sensor that senses a load applied to the handle;
  at least one wheel that moves the walking support robot; and
  a first processor that, in operation, performs first operations including:
    controlling rotation of the at least one wheel in accordance with the load sensed by the sensor;
    generating guide information for guiding the user to walk along a walking route,
    controlling presented information for guiding the user on a basis of the guide information;
    causing the presented information to be transmitted over the network;
    setting a physical task by adjusting complexity of the walking route;
    calculating a following degree to which the user follows the walking route based on a difference between a distance which the user has walked along the walking route and a distance which the user has moved in a direction different than the walking route; and
    changing an intensity of the physical task on a basis of the following degree,
  wherein, in the changing, a force opposite to a moving direction is generated in the at least one wheel in a case where the following degree is lower than a first predetermined threshold value, and
the presenting device includes
  a second processor that, in operation, performs second operations including:
    receiving the presented information that is transmitted over the network; and
    presenting the presented information.

13. The walking support system according to claim 12, wherein the first operations further include:
  setting a cognitive task;
  presenting the cognitive task;
  calculating a cognitive task achievement degree of the user;
  causing information on the cognitive task to be transmitted over the network; and
  changing the cognitive task on a basis of the following degree and the cognitive task achievement degree;
wherein the second operations further include:
  receiving the information on the cognitive task that is transmitted over the network; and
  presenting the cognitive task.

14. The walking support system according to claim 13, wherein
the first operations further include:
  lowering a degree of difficulty of the cognitive task in a case where the cognitive task achievement degree is lower than a second predetermined threshold value; and
  increasing the degree of difficulty of the cognitive task in a case where the cognitive task achievement degree is higher than a third predetermined threshold value.

15. The walking support system according to claim 13, wherein
the first operations further include:
  lowering a degree of difficulty of the cognitive task in a case where the following degree is lower than a second predetermined threshold value; and
  increasing the degree of difficulty of the cognitive task in a case where the following degree is higher than a third predetermined threshold value.

16. The walking support system according to claim 13, wherein
the first operations further include changing the intensity of the physical task further on a basis of the cognitive task achievement degree.

17. The walking support system according to claim 13, wherein
the first operations further include:
  determining complexity of an environment surrounding the walking support robot; and
  changing the cognitive task further on a basis of the complexity of the environment.

18. The walking support system according to claim 17, wherein
the first operations further include changing a kind of the cognitive task presented by the presenting of the cognitive task on the basis of the complexity of the environment.

19. The walking support system according to claim 12, wherein
the first operations further include:
  estimating a movement intention of the user on a basis of the load;
  calculating a guide intention of the walking support robot; and moving
  the walking support robot by controlling rotation of the at least one wheel on a basis of the guide intention.

20. A walking support robot comprising:
  a body;
  a handle that is on the body and configured to be held by a user;
  a sensor that senses a load applied to the handle;
  at least one wheel that moves the walking support robot; and
  a processor that, in operation, performs operations including:
    controlling rotation of the at least one wheel in accordance with the load sensed by the sensor;
    generating guide information for guiding the user to walk along a walking route;
    presenting presented information for guiding the user on a basis of the guide information;
    setting a physical task by adjusting complexity of the walking route;
    setting a cognitive task;
    determining a cognitive task achievement degree of the user;
    calculating a following degree to which the user follows the walking route based on a difference between a distance which the user has walked along the walking route and a distance which the user has moved in a direction different than the walking route; and;
    changing the cognitive task on a basis of the following degree; and
    changing an intensity of the physical task on a basis of the cognitive task achievement degree,
  wherein, in the changing, a force opposite to a moving direction is generated in the at least one wheel in a case where the following degree is lower than a predetermined threshold value.

* * * * *